(12) United States Patent
Udono et al.

(10) Patent No.: US 10,979,145 B2
(45) Date of Patent: Apr. 13, 2021

(54) OPTICAL TRANSMITTER AND OPTICAL TRANSMISSION METHOD

(71) Applicant: Honda Motor Co., Ltd., Tokyo (JP)

(72) Inventors: Kenro Udono, Saitama (JP); Yuki Endo, Saitama (JP); Yoshiki Maezawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/821,978

(22) Filed: Mar. 17, 2020

(65) Prior Publication Data
US 2020/0313772 A1    Oct. 1, 2020

(30) Foreign Application Priority Data

Mar. 28, 2019  (JP) .............................. JP2019-062464
Mar. 28, 2019  (JP) .............................. JP2019-062465
Mar. 29, 2019  (JP) .............................. JP2019-067296

(51) Int. Cl.
*H04B 10/00*     (2013.01)
*H04B 10/50*     (2013.01)
*H04B 10/116*    (2013.01)

(52) U.S. Cl.
CPC .......... *H04B 10/50* (2013.01); *H04B 10/116* (2013.01)

(58) Field of Classification Search
CPC ............................. H04B 10/50; H04B 10/116
See application file for complete search history.

(56) References Cited

U.S. PATENT DOCUMENTS

| | | | |
|---|---|---|---|
| 7,589,642 B1* | 9/2009 | Mui ..................... | G08C 17/00 340/12.3 |
| 9,628,255 B1* | 4/2017 | Baidas ................. | H04L 7/0008 |
| 2006/0279438 A1* | 12/2006 | Kishi ................... | H04B 10/802 341/51 |
| 2009/0026978 A1* | 1/2009 | Robinson ............ | H05B 47/175 315/294 |
| 2009/0214225 A1* | 8/2009 | Nakagawa ............ | H05B 45/22 398/191 |
| 2010/0327754 A1* | 12/2010 | Schenk ................. | H05B 45/10 315/151 |

(Continued)

FOREIGN PATENT DOCUMENTS

| | | |
|---|---|---|
| JP | 2010098574 | 4/2010 |
| JP | WO2017104166 | 3/2018 |

*Primary Examiner* — David C Payne
*Assistant Examiner* — Pranesh K Barua
(74) *Attorney, Agent, or Firm* — JCIPRNET

(57) ABSTRACT

An optical transmitter and an optical transmission method that enable asynchronous operations between transmitters and between the transmitter and a receiver and do not require a synchronization signal line and a synchronization signal generator for connecting between the devices are provided. An optical transmitter includes a generating part generating transmission information including identification information unique to a device and composed of a plurality of bits and generating transmission data with each bit of the generated transmission information in combination of a light-off state and a light-on state, and a transmitting part transmitting a unique beacon signal by controlling the light-on state and the light-off state of a light emitting part in accordance with the generated transmission data.

5 Claims, 17 Drawing Sheets

(56) References Cited

U.S. PATENT DOCUMENTS

| | | | | |
|---|---|---|---|---|
| 2013/0026945 A1* | 1/2013 | Ganick | ................... | H05B 45/10 315/246 |
| 2014/0086587 A1* | 3/2014 | Roberts | ................ | H04B 10/116 398/115 |
| 2014/0093234 A1* | 4/2014 | Roberts | ................. | H04B 10/60 398/25 |
| 2014/0265878 A1* | 9/2014 | Gritti | ..................... | H05B 47/10 315/153 |
| 2014/0308048 A1* | 10/2014 | Roberts | .................... | H04L 1/08 398/187 |
| 2015/0200788 A1* | 7/2015 | Thomas | ............ | H04M 1/72533 455/420 |
| 2015/0245448 A1* | 8/2015 | Readler | ................. | G08C 17/00 398/106 |
| 2015/0263808 A1* | 9/2015 | Kondo | .................. | H04B 10/116 398/115 |
| 2015/0295738 A1* | 10/2015 | Mori | ................... | H04L 25/4902 375/238 |
| 2016/0191159 A1* | 6/2016 | Aoyama | ............. | H04B 10/116 398/172 |
| 2017/0104310 A1* | 4/2017 | Yang | ........................ | H01S 5/50 |
| 2017/0150582 A1* | 5/2017 | Clout | ..................... | H05B 47/18 |
| 2017/0237488 A1* | 8/2017 | Aoyama | ............... | H04B 10/50 398/118 |
| 2019/0107624 A1* | 4/2019 | Ohki | ....................... | G08B 25/10 |
| 2019/0164393 A1* | 5/2019 | Saeki | ....................... | G08B 5/36 |
| 2020/0076529 A1* | 3/2020 | Li | ........................ | H04L 1/0002 |

* cited by examiner in case of H=0      : regarded as Start bit or ID unredable (insufficient light amount)
in case of H=1      : ID unredable (insufficient light amount)
in case of 2≤H≤3 : "0"
in case of 4≤H≤5 : "1"
in case of H=6      : ID unredable (excessive light amount) or light source other than light
                              emitting source however, at time of reversing of sub data set and start of sub data set excluded

FIG. 11

OPTICAL TRANSMITTER AND OPTICAL TRANSMISSION METHOD

CROSS-REFERENCE TO RELATED APPLICATION

This application claims the priority benefit of Japan Application No. 2019-062464, filed on Mar. 28, 2019, Japan Application No. 2019-062465, filed on Mar. 28, 2019 and Japan Application No. 2019-067296, filed on Mar. 29, 2019. The entirety of the above-mentioned patent applications is hereby incorporated by reference herein and made a part of this specification.

BACKGROUND

Technical Field

The disclosure relates to an optical transmitter and an optical transmission method.

Description of Related Art

In a case where a plurality of light emitting parts (e.g., light emitting diode light sources) having a specific communication code and a light receiving part (e.g., a camera, etc.) having a limited exposure time perform communication, if signals are transmitted by simply expressing brightness and darkness of light with one bit, signal synchronization between the light emitting parts and between the light emitting part and the light receiving part is required (e.g., see Patent Document 1: Republication of WO 2017/104166). In other words, in the technology described in Patent Document 1, a signal line and a synchronization signal generation device for synchronization between the light emitting parts and the light receiving part and power supply thereto are needed.

FIG. 20 is a diagram illustrating a configuration example of the related art. In a case where communication is performed using intermittent sampling data (e.g., images captured by a camera), or the like, transmitters (light emitting parts 901) and a light receiving part (camera 911) must be synchronized (have matching phases) and carrier frequencies thereof must be completely the same as illustrated in FIG. 20. For this reason, in such a case where communication is performed using intermittent sampling data (e.g., images captured by a camera) or the like, the synchronization signal generator 903 and the synchronization signal line 902 are needed in all devices. Further, in FIG. 20, the TX 904 is a transmitter, and the RX 913 is a receiver. In addition, the image processing device 912 processes images captured by the camera 911. In addition, captured images include images of light emitted by the light emitting parts 901. The technology of the related art requires a signal line and a synchronization signal generation device for synchronization between the light emitting parts and the light receiving part and power supply thereto.

In addition, as a device that receives optical signals emitted by light emitting parts using a light receiving part, a visible light communication system including a transmitting device that has a plurality of light emitting parts that emit light in different colors, associates transmission data with a chromaticity point on chromaticity coordinates and calculates a light emission amount of each light emitting part so that color light of the chromaticity point corresponding to the transmission data is radiated, generates a preamble signal to be used for inferring a channel matrix, and causes each light emitting part to emit light on the basis of the preamble signal and the calculated light emission amount, and a receiving device that has a plurality of light receiving parts that receives optical signals in different colors, infers a channel matrix on the basis of an optical signal corresponding to the preamble signal when the optical signal is received by each light receiving part, applies propagation path compensation to the optical signal corresponding to the chromaticity point on the basis of the inferred channel matrix, and detects the chromaticity point on the chromaticity coordinates on the basis of the propagation path-compensated signal and demodulates the transmission data has been proposed (e.g., see Patent Document 2: Japanese Patent Laid-Open No. 2010-98574). In the technology disclosed in Patent Document 2, the preamble signal generated on the basis of a synchronous code is connected to each light emitting part in the transmitting device. The technology disclosed in Patent Document 2 also requires a signal line and a synchronization signal generating device for power supply to each of the light emitting parts and the light receiving parts and synchronization thereof.

Each technology of the related art, however, requires a signal line and a synchronization signal generating device for power supply to each of the light emitting parts and the light receiving parts and synchronization thereof. In a case where, for example, installation of "a position identification system using a plurality of light emitting parts and a camera having unique IDs (identifiers)" is considered, infrastructure construction work is performed in a large scale and introduction costs therefor are high. Furthermore, if one side of the light emitting parts and the camera is a moving body, wired connection is often difficult and thus wireless communication is required, which makes the system more complicated, and therefore, delay and malfunction occur. Particularly, if the light receiving part is positioned in a moving body, wireless communication needs to be selected, but delay is not acceptable, and thus construction of the system becomes difficult.

The disclosure provides an optical transmission device and an optical transmission method that enable asynchronous operations between transmitters and between the transmitter and a receiver and do not require a synchronization signal line and a synchronization signal generator for connecting the transmitters to each other and the transmitters to the receiver.

SUMMARY

An optical transmitter (transmitter 2) according to an aspect of the disclosure includes a generating part (transmission information generating part 21 and encoder 22) generating transmission information including identification information (ID) unique to a device and composed of a plurality of bits and generating transmission data with each bit of the generated transmission information in combination of a light-off state and a light-on state and a transmitting part (23) transmitting a unique beacon signal by controlling the light-on state and the light-off state of a light emitting part (24) in accordance with the generated transmission data.

An optical transmission method according to an embodiment of the disclosure is an optical transmission method of an optical transmission device having a light emitting part, the optical transmission method including a generating step generating, by a generating part, transmission information including identification information unique to a device and composed of a plurality of bits and generating transmission data with each bit of the generated transmission information in combination of a light-off state and a light-on state, and a transmitting step transmitting, by a transmitting part, a unique beacon signal by controlling the light-on state and the light-off state of the light emitting part in accordance with the generated transmission data.

BRIEF DESCRIPTION OF THE DRAWINGS

FIG. 11 is a diagram showing an example of determination standards according to an embodiment.

DESCRIPTION OF THE EMBODIMENTS

Figure 1:
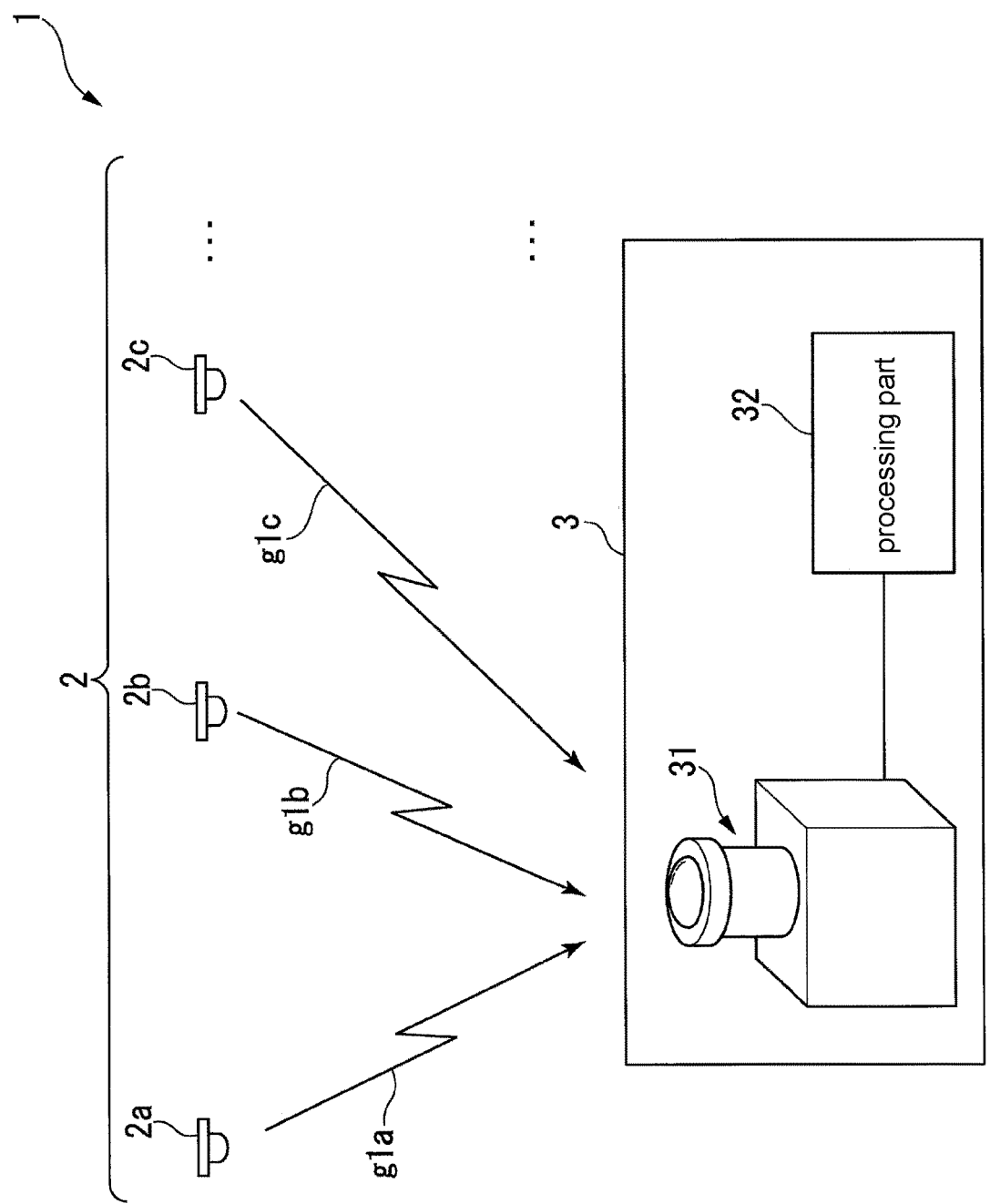
FIG. 1 is a diagram illustrating a configuration example of an optical communication system according to an embodiment.

Embodiments of the disclosure will be described below with reference to the drawings. Further, in the drawings used for the following description, the scales of respective members have been appropriately changed to make the members be a recognizable size.

Configuration of Optical Communication System

First, a configuration example of an optical communication system will be described.

FIG. 1 is a diagram illustrating a configuration example of an optical communication system 1 according to the present embodiment. The optical communication system 1 includes transmitters 2a, 2b, 2c, ... and a receiver 3 as illustrated in FIG. 1. Further, in the following description, the transmitters 2a, 2b, 2c, ... will be referred to as "transmitters 2" unless one of the transmitters is specified. The transmitters 2 transmit unique beacon signals (g1a, g1b, g1c, ) using states of light-on and light-off. In addition, the receiver 3 includes a photographing part 31 and a processing part 32. The beacon signals include identification information (ID) for identifying each of the transmitters 2, as will be described below.

Next, a configuration example of each of the transmitters 2 and the receiver 3 will be described. Further, a case where the transmitters 2a, 2b, 2c, ... illustrated in FIG. 1 have the same configuration will be introduced in the following description. Further, the transmitters 2a, 2b, 2c, ... may have different configurations.

Figure 2:
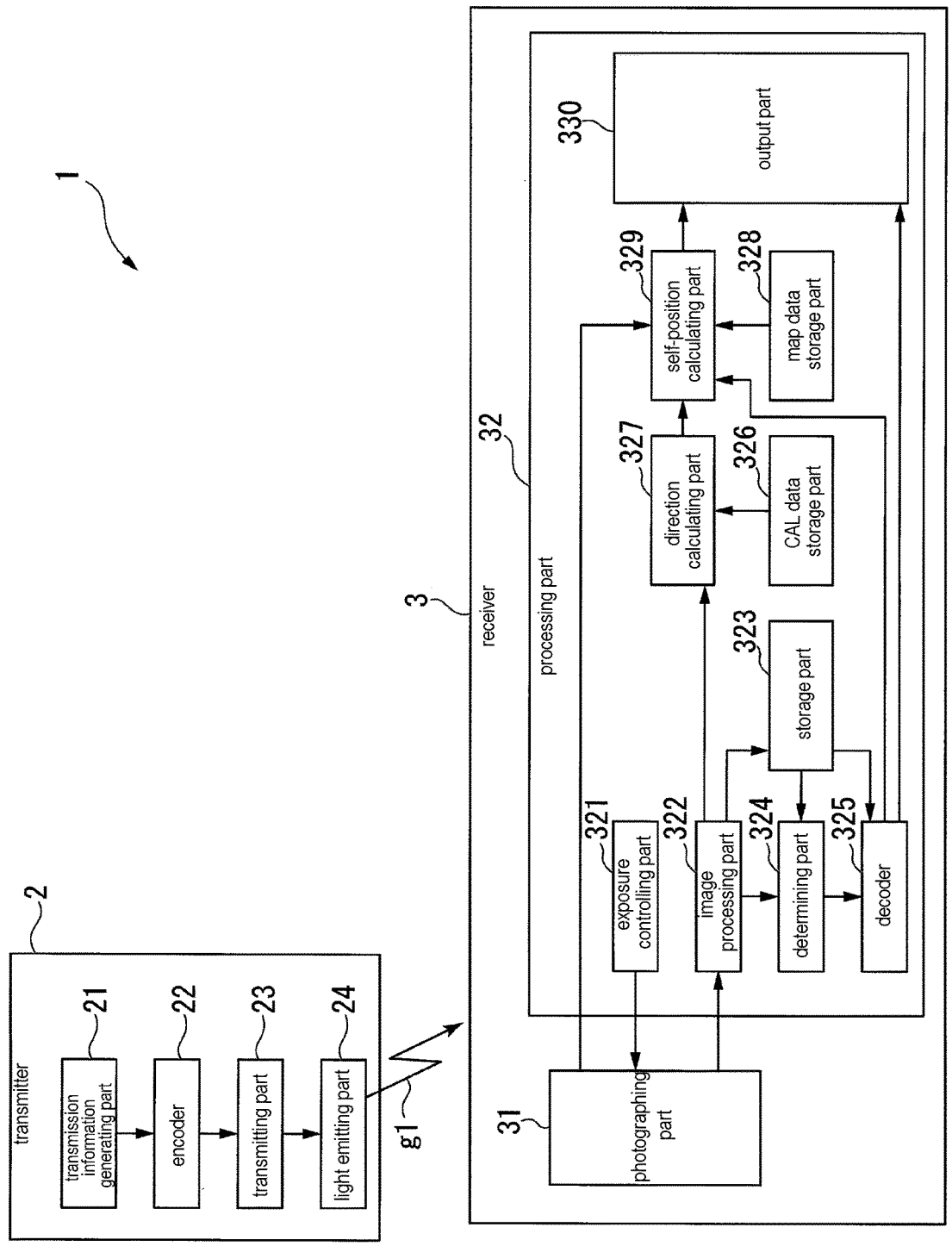
FIG. 2 is a block diagram illustrating a configuration example of an optical communication system according to an embodiment.

FIG. 2 is a block diagram illustrating a configuration example of the optical communication system 1 according to the present embodiment. The optical communication system 1 includes the transmitter 2 and the receiver 3 as illustrated in FIG. 2.

The transmitter 2 includes a transmission information generating part 21 (generating part), an encoder 22 (generating part), a transmitting part 23, and a light emitting part 24.

The receiver 3 includes the photographing part 31 and the processing part 32. The processing part 32 includes an exposure controlling part 321, an image processing part 322, a storage part 323, a determining part 324, a decoder 325, a CAL data storage part 326, a direction calculating part 327, a map data storage part 328, a self-position calculating part 329, and an output part 330.

In the optical communication system 1 of the present embodiment, the transmitters 2 are asynchronous with each other and asynchronous with the receiver 3 as illustrated in FIG. 2, unlike technologies of the related art. Thus, the transmitter 2 do not transmit and receive synchronization signals to and from each other in the optical communication system 1 of the present embodiment. In addition, likewise, the transmitters 2 and the receiver 3 do not transmit and receive synchronization signals to and from each other in the optical communication system 1 of the present embodiment.

The transmitters 2 transmits unique beacon signals (codes g1) in states of light-on and light-off. Further, the transmitters 2 are asynchronous with each other and also asynchronous with the receiver 3, unlike the technologies of the related art. Thus, the transmitters 2 do not transmit and receive synchronization signals to and from each other. In addition, likewise, the transmitters 2 and the receiver 3 do not transmit and receive synchronization signals to and from each other. Further, positions in a world coordinate system (which will also be referred to as "beacon coordinates" below) at which the transmitters 2 are installed are known.

The transmission information generating part 21 generates transmission information and outputs the generated transmission information to the encoder 22. Further, the transmission information includes identification information (ID) for identifying the transmitters 2. In addition, the transmission information may include information indicating beacon coordinates.

The encoder 22 encodes the transmission information output by the transmission information generating part 21 and generates transmission data as will be described below. The encoder 22 outputs the generated transmission data to the transmitting part 23. Further, 1 bit of the transmission data includes, for example, high (H) levels and low (L) levels of six units (six predetermined times) as will be described below. In addition, one set of main data includes a start bit, a data bit, and a parity bit as will be described below. Further, configurations of units and transmission data, and the like will be described below.

The transmitting part 23 controls transmission of the beacon signals by performing control such that the light emitting part 24 is turned on at an H-level signal and the light emitting part 24 is turned off at an L-level signal on the basis of the transmission data output by the encoder 22. Further, the transmitting part 23 controls light-on and light-off by controlling a value of a current or a voltage to be supplied to the light emitting part 24.

The light emitting part 24 is, for example, a light emitting diode (LED) and transmits beacon signals by performing light-on and light-off in accordance with the control of the transmitting part 23. Further, a wavelength of the light source is, for example, infrared rays (IR). Further, a wavelength of the light source is not limited to infrared rays.

The receiver 3 extracts the transmission information from the received beacon signals. In addition, the receiver 3 obtains a self-position on the basis of the beacon signals received from the plurality of transmitters 2. Further, the receiver 3 may acquire position information of each transmitter 2 from the beacon signals or from an external device (not illustrated) or may store the position information in the map data storage part 328 in advance.

The photographing part 31 performs capturing of the transmission data at a frame rate of one unit in accordance with control of the exposure controlling part 321 and outputs the captured image to the processing part 32. The photographing part 31 includes an inertia sensor (not illustrated), a distance sensor (not illustrated), and the like. The photographing part 31 outputs detection results of detection by the sensors to the self-position calculating part 329.

The processing part 32 performs image processing on the captured image and extracts the transmission information.

The exposure controlling part 321 controls exposure timings of the photographing part 31. Further, the exposure timings will be described below.

The image processing part 322 acquires the image captured by the photographing part 31 and causes the acquired image to be stored in the storage part 323. The image processing part 322 performs image processing on the acquired image. Further, the image processing will be described below. The image processing part 322 outputs the image processing result to the determining part 324 and the direction calculating part 327. The result output by the image processing part 322 includes coordinates (u, v) of a bright spot corresponding to a beacon signal in camera coordinates. Further, the captured image and the like will be described below.

The storage part 323 stores captured images. The storage part 323 stores a threshold of an image for determining whether a pixel area corresponding to each signal included in the captured image is at an H level or an L level. The storage part 323 stores determination standards to be used in determination of bits of the transmission information. Further, the determination standards will be described below. The storage part 323 stores information necessary for the image processing. The storage part 323 stores information necessary for decoding.

The determining part 324 determines whether a pixel area corresponding to each signal included in the captured image is at an H level or an L level for the processed image output by the image processing part 322 on the basis of the threshold stored in the storage part 323. The determining part 324 outputs the determination result to the decoder 325.

The decoder 325 determines whether a bit is a light emission pattern of "0" or a light emission pattern of "1" on the basis of the determination standards stored in the storage part 323. Further, the light emission pattern of "0" and the light emission pattern of "1" will be described below. The decoder 325 extracts (decodes) information from the beacon signals on the basis of the determination result. The decoder 325 outputs the extracted information to the self-position calculating part 329 and the output part 330.

The CAL data storage part 326 stores calibration data unique for a combination of a lens, an image sensor, and the like of the photographing part 31.

The direction calculating part 327 calculates directions in which the beacon signals are transmitted using the calibration data stored in the CAL data storage part 326 on the basis of the processed image output by the image processing part 322. Further, the direction calculation method will be described below. The direction calculating part 327 outputs direction information indicating the calculated direction to the self-position calculating part 329. Further, the direction information output by the direction calculating part 327 includes a direction (azimuth $\omega$, elevation $\theta$) of the beacon signal with respect to the photographing part 31.

The map data storage part 328 stores, for example, map data of regions to be used by the optical communication system 1.

The self-position calculating part 329 acquires the detection results output by the photographing part 31 and the direction information output by the direction calculating part 327. The self-position calculating part 329 calculates a self-position of each transmitter 2 using the detection results, the direction information, and the map data stored in the map data storage part 328. The self-position calculating part 329 outputs position information indicating the calculated position to the output part 330. The position information output by the self-position calculating part 329 includes the self-position (x, y, z, $\theta z$) in the world coordinate system. Further, the position calculation method will be described below.

The output part 330 outputs the information output by the decoder 325 and the position information output by the self-position calculating part 329 to an external device (e.g., a display device, a signal processing device, etc.) (not illustrated).

Configuration of Transmission Data

Next, a configuration of transmission data will be described with reference to FIGS. 3 and 4.

First, light emission patterns of beacon signals according to the present embodiment will be described.

Figure 3:
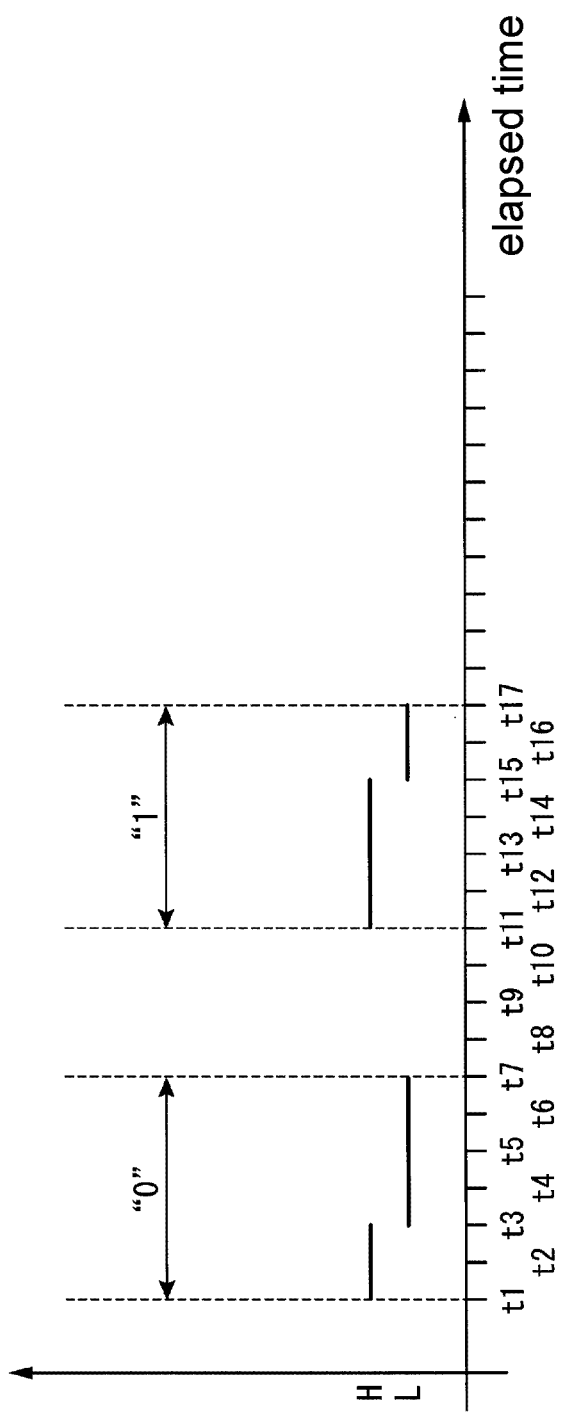
FIG. 3 is a diagram illustrating light emission patterns of "0" and "1" of beacon signals according to an embodiment.

FIG. 3 is a diagram illustrating light emission patterns of "0" and "1" of beacon signals according to the present embodiment. In FIG. 3, the horizontal axis represents elapsed time, and the vertical axis represents signal level (H level and L level). Further, "0" and "1" represents bits of beacon signals. In the present embodiment, the bits are expressed by a length of a light emission time of the light emitting part 24 (optical signal) as illustrated in FIG. 3. In addition, in the following description, one bit is a 6 unit communication time. Further, one unit is a predetermined time period and is a period from tn (n is an integer equal to or greater than 1) to tn+1 in FIG. 3.

A signal in the period from a time t1 to a time t7 has a light emission pattern of "0." The light emission pattern of "0" includes light-on (H level) in the period from the time t1 to the time t3 (first predetermined light-on time) and light-off (L level) in the period from the time t3 to the time t7 (first predetermined light-off time). That is, the light emission pattern of "0" includes light-on in two unit times and light-off in four unit times. In other words, the light emission pattern of "0" includes a combination of a predetermined light-on time (first predetermined light-on time) with a predetermined light-off time (first predetermined light-off time).

In addition, a signal in the period from time t11 to time t17 has the light emission pattern of "1" The light emission pattern of "1" includes light-on (H level) in the period from the time t11 to the time t15 (second predetermined light-on time) and light-off (L level) in the period from the time t15 to the time t17 (second predetermined light-off time). That is, the light emission pattern of "1" includes light-on in four unit times and light-off in two unit times. In other words, the light emission pattern of "1" includes a combination of a predetermined light-on time (second predetermined light-on time) that is different from that of the light emission pattern of "0" and a predetermined light-off time (second predetermined light-off time) that is different from that of the light emission pattern of "0."

The encoder 22 of the transmitter 2 converts (encodes) "0" to "HHLLLL" and converts (encodes) "1" to "HHHHLL" as described above. In addition, the transmitting part 23 of the transmitter 2 performs control such that the light emitting part 24 is turned on at the H levels and the light emitting part 24 is turned off at the L levels.

Next, a configuration example of a beacon signal will be described.

Figure 4:
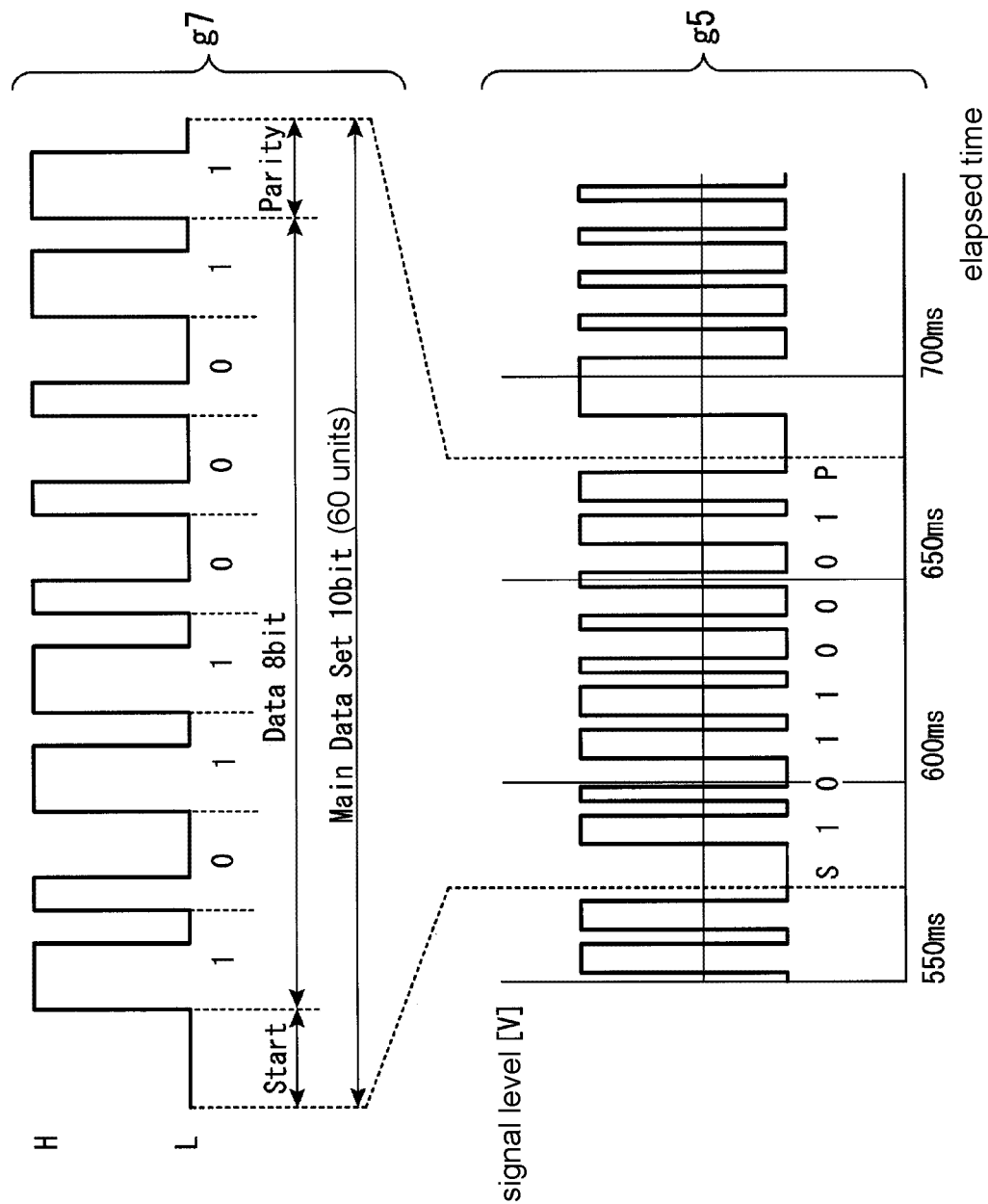
FIG. 4 is a diagram illustrating a configuration example of a beacon signal according to an embodiment.

FIG. 4 is a diagram illustrating a configuration example of a beacon signal according to the present embodiment. In FIG. 4, the figure represented by reference symbol g5 illustrates an example of measured values of a control voltage of a beacon signal measured with respect to the light emitting part 24. In addition, the drawing represented by the reference symbol g7 illustrates a main data set in the beacon signal of the reference symbol g5. Further, in FIG. 4, the horizontal axis represents elapsed time, the vertical axis of reference symbol g5 represents signal level [V], and the vertical axis of reference symbol g7 represents signal levels (H level and L level).

The main data set of the beacon signal includes a start bit (Start, S), data bits (Data), and a parity bit (Parity, P) as illustrated in FIG. 4. The data bits created according to the rule of FIG. 3 are "1," "0," "1," "1," "0," "0," "0," and "1," and a parity bit is "1."

The start bit is one bit (6 units) and is provided before the data bits. In addition, the start bit is a continuous light-off signal and indicates light-off in six units in the example illustrated in FIG. 4. The start bit indicates a start or an end of a data sequence and has a light emission pattern of entirely light-off in a predetermined time period and the pattern is a light emission pattern different from the light emission patterns of "0" and "1" as described above.

The data bits are provided continuously after the start bit and have information of, for example, eight bits and more. Further, the data bits may include an error detection code and an error correction code.

The parity bit is one bit (6 units), is provided continuously with the data bits, and is, for example, an odd parity. The parity bit is set such that the number of "1"s is an odd number including the parity bit itself for all the bits. Further, light exposure of the receiver 3 in a case of six units will be described below with reference to FIG. 9 and FIG. 10.

Further, although an example in which one bit is six units has been described in the example illustrated in FIG. 4, one bit may be, for example, six or less units, or six or more units.

For example, three units may be assigned to one bit, the start bit may be set to LLL, the light emission pattern of "0" may be set to HLL, and the light emission pattern of "1" may be set to HHL. In this case, the photographing part 31 performs capturing with twice the number of exposure operations for one unit, and thus the same effects as those in a case where six units are assigned to one bit can be obtained. Also in this case, the main data set has a total of n+2 bits including one bit for the start bit, n bits for the data set, and one bit for the parity bit.

Further, although an example in which the light emission patterns of "0" and "1" start from the H level has been described in the example illustrated in FIG. 3, the disclosure is not limited thereto. For example, the light emission pattern of "0" may start from the L level and light may be on in two units after light-off in four units, or the light emission pattern of "1" may start from the L level and light may be on in four units after light-off in two units. In addition, the H level may be set for light-off and the L level may be set for light-on. The start bit in this case is a continuous light-on signal and light is on in six units. The start bit indicates a start or an end of a data sequence, has a light emission pattern of entirely light-on in a predetermined time period and the pattern is a light emission pattern different from the light emission patterns of "0" and "1."

Sub Data Set

Next, an example of a sub data set will be described.

Figure 5:
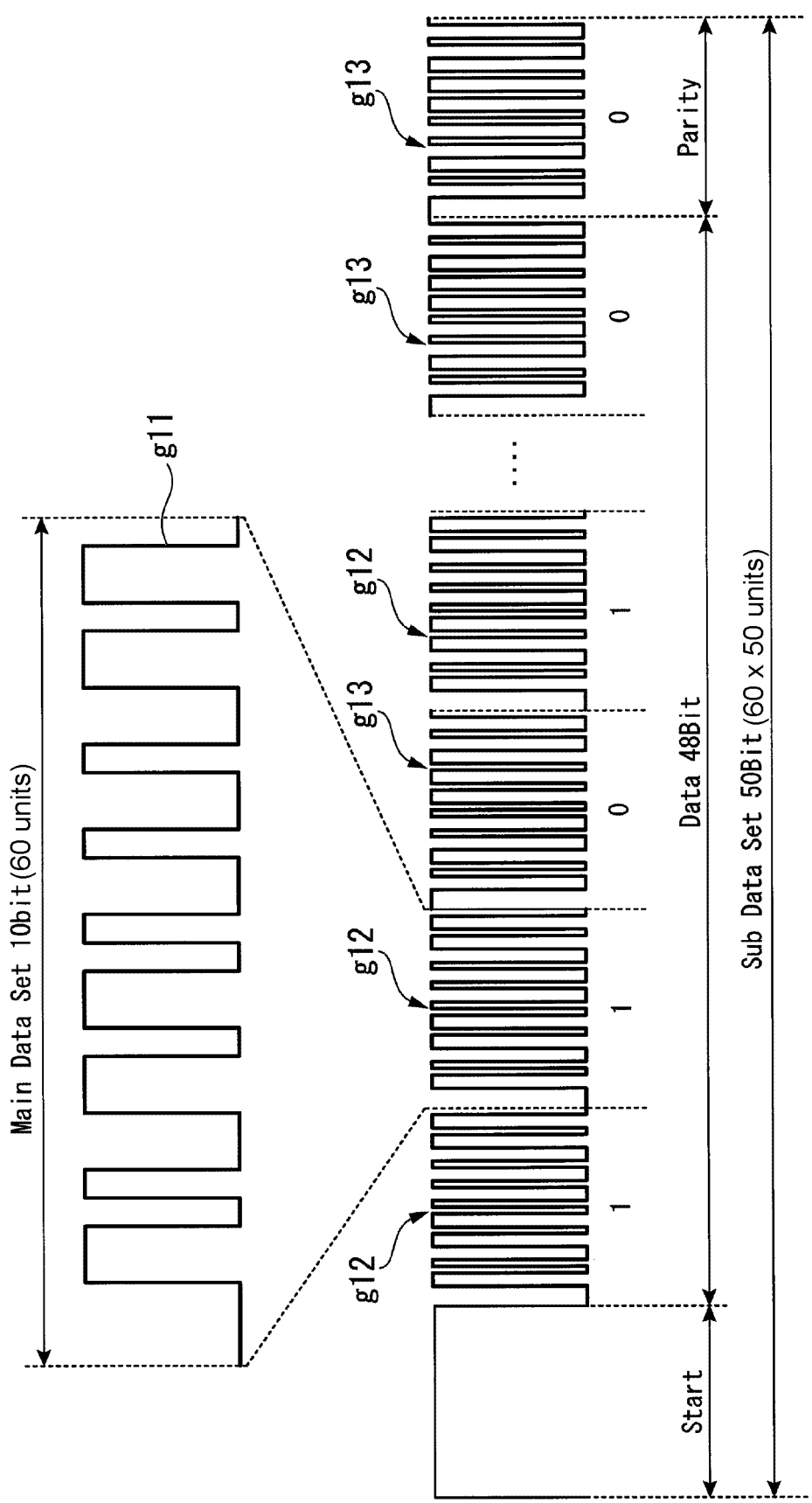
FIG. 5 is a diagram illustrating an example of a sub data set superimposed on a main data set according to an embodiment.

A beacon signal may have not only the main data set illustrated in FIG. 4 but also a sub data set superimposed on the main data set. FIG. 5 is a diagram illustrating an example of a sub data set superimposed on a main data set according to the present embodiment. Further, in the example illustrated in FIG. 5, one bit (six units) of main data corresponds to one bit (60 units) of sub data.

In the example illustrated in FIG. 5, the main data set has a total of 50 bits including a start bit (one bit), data bits (48 bits), and a parity bit (one bit). In addition, the sub data is superimposed on the data bits and the parity bit. Reference symbol g11 represents a diagram showing the enlarged second bit of the data bit. In addition, in the example of FIG. 5, forwarding of the main data set=1 and reversing thereof=0 are used in the superimposition of the sub data set.

First, in the start bit, the light-on state is maintained in 1 bit=60 units of the sub data.

Next, in sub data bit, reference symbol g12 represents forwarding since the data bit has the light emission pattern of "1" and reference symbol g13 represents reversing since the data bit has the light emission pattern of "0."

In addition, the parity bit is reverse due to the light emission pattern of "0."

Further, transmission of the main data is not possible during the 60 units of the start bit.

By performing repetitive forwarding and reversing transmission of the main data set as illustrated in FIG. 5, the sub data can be superimposed on the main data and continuously transmitted. By allocating information with a low processing frequency to the sub data set, for example, information that needs to be processed at all times can be acquired faster.

Further, the number of bits of the data bit and the number of units of the sub data illustrated in FIG. 5 are merely examples and not limited thereto. In addition, in the superimposition of sub data set, forwarding of the main data set=0 and reversing thereof=1 may be applied. In addition, one bit of the sub data may be equal to or lower than 50 units or greater than or equal to 50 units.

Transmission Process of Transmitter

Next, an example of the procedure for a transmission process performed by the transmitter 2 will be described.

Figure 6:
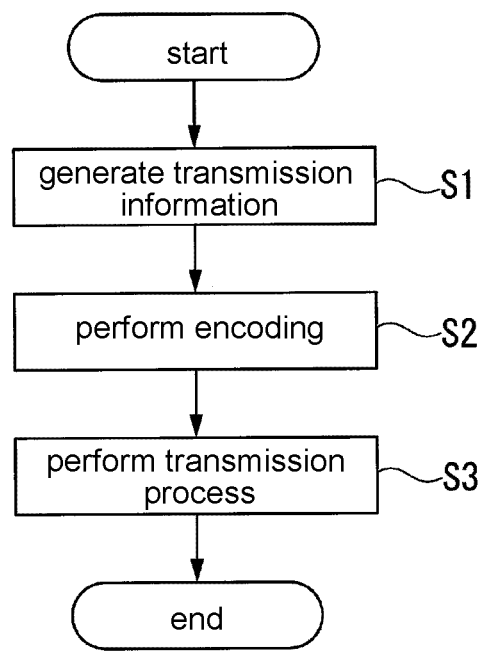
FIG. 6 is a flowchart of the procedure for a transmission process performed by a transmitter according to an embodiment.

FIG. 6 is a flowchart of the procedure for a transmission process performed by the transmitter 2 according to the present embodiment.

(Step S1) The transmission information generating part 21 generates transmission information.

(Step S2) The encoder 22 encodes the transmission information output by the transmission information generating part 21 and thereby generates transmission data. Further, in a case where sub data is included therein, the encoder 22 performs encoding of the sub data as well. In addition, the transmission data includes a start bit, data bits, and a parity bit as described above. Thus, during the encoding, the encoder 22 adds the start bit before the data bits, further calculates the parity bit, and adds the calculated parity bit after the data bits.

(Step S3) The transmitting part 23 performs control such that beacon signals are transmitted by performing control such that, on the basis of the transmission data output by the encoder 22, the light emitting part 24 is turned on for data of an H level and the light emitting part 24 is turned off for data of an L level.

Image Processing of Receiver

Next, image processing performed by the receiver 3 will be described.

Figure 7:
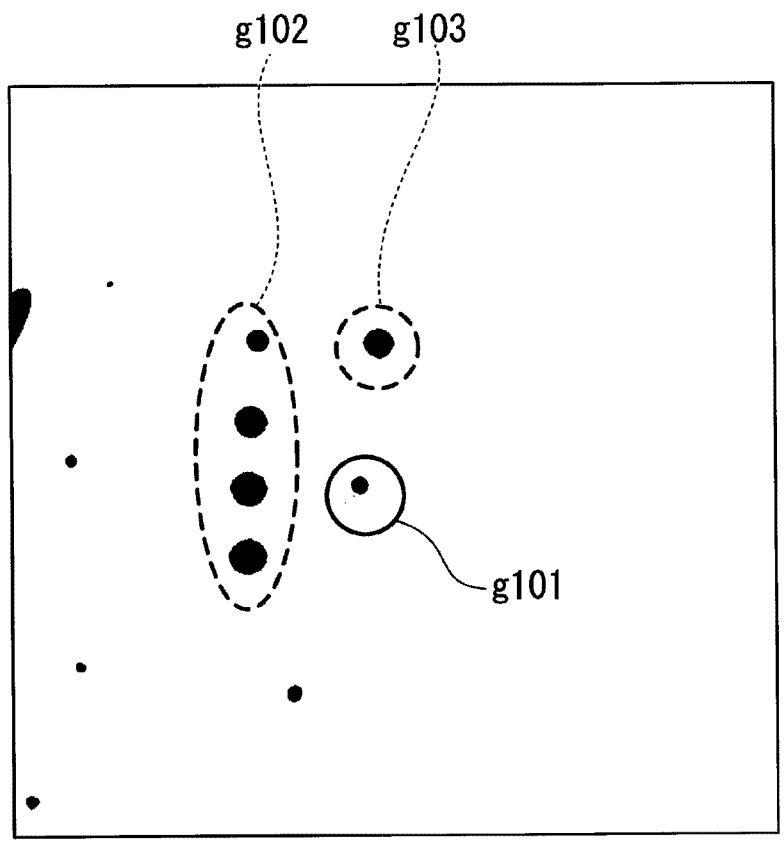
FIG. 7 is a diagram illustrating an example of an image including light from a transmitter captured by a photographing part in a full sensitivity range according to an embodiment.

FIG. 7 is a diagram illustrating an example of an image including light from a transmitter captured by the photographing part in a full sensitivity range according to the present embodiment. In FIG. 7, reference symbol g101 represents an image of a bright spot of a beacon signal, and reference symbols g102 and g103 represent images of light from downlight lighting. In the image captured by the receiver 3, an image of a light source other than the transmitter 2 may be included. Further, in FIG. 7, white and black are reversed for the sake of description.

Figure 8:
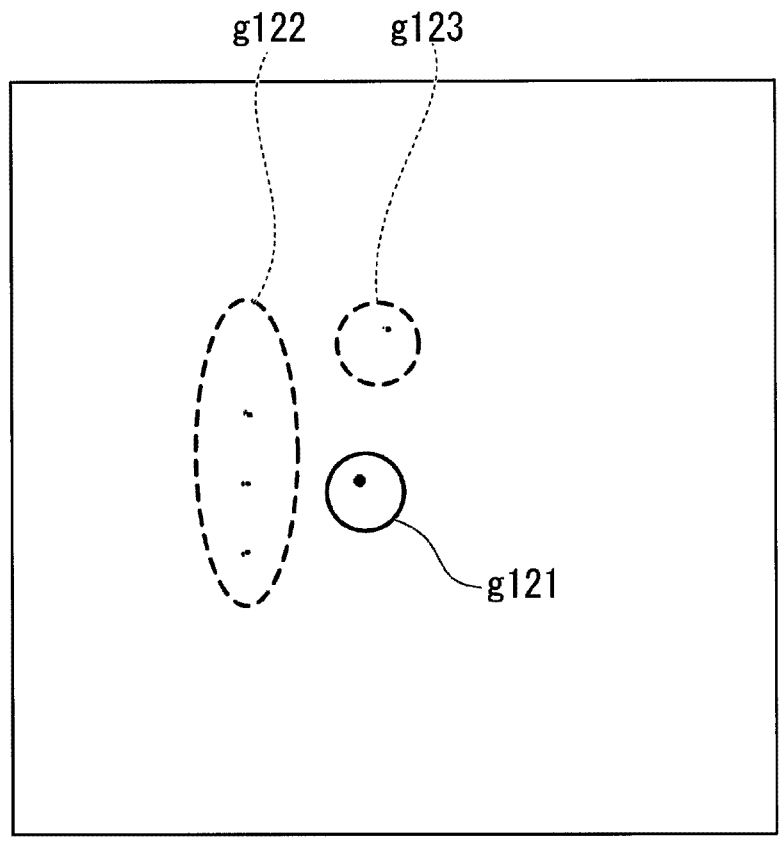
FIG. 8 is a diagram illustrating an example of an image captured after filtering is performed in an optical system according to an embodiment.

FIG. 8 is a diagram illustrating an example of an image captured after filtering is performed in an optical system according to the present embodiment. Further, the example illustrated in FIG. 8 is an image obtained after a bandpass filter (BPF) that passes light of the IR band has been used for the captured image illustrated in FIG. 7. That is, in the present embodiment, the BPF is applied in the optical system before the stage of the image sensor included in the photographing part 31. The reason for this is that, if the photographing part 31 is a black/white imaging device, luminance information is used after capturing. In addition, in FIG. 8, white and black are reversed for the sake of description. Reference symbol g121 represents an image of a bright spot of a beacon signal, and reference symbols g122 and g123 represent images of light from downlight lighting. Since the BPF is used in the present embodiment as described above, an image with unnecessary visible light illumination can be removed or attenuated, and thus detection accuracy can be improved. Further, the processing part 32 may remove the image of the areas of reference symbol g122 and g123 by further performing, for example, a clustering process or the like and extracting an image of a white area in a size greater than or equal to a threshold.

Determination of Light-On and Light-Off on Receiver Side

Next, an example of determination of light-off and light-on will be described using FIG. 9 to FIG. 11.

Figure 9:
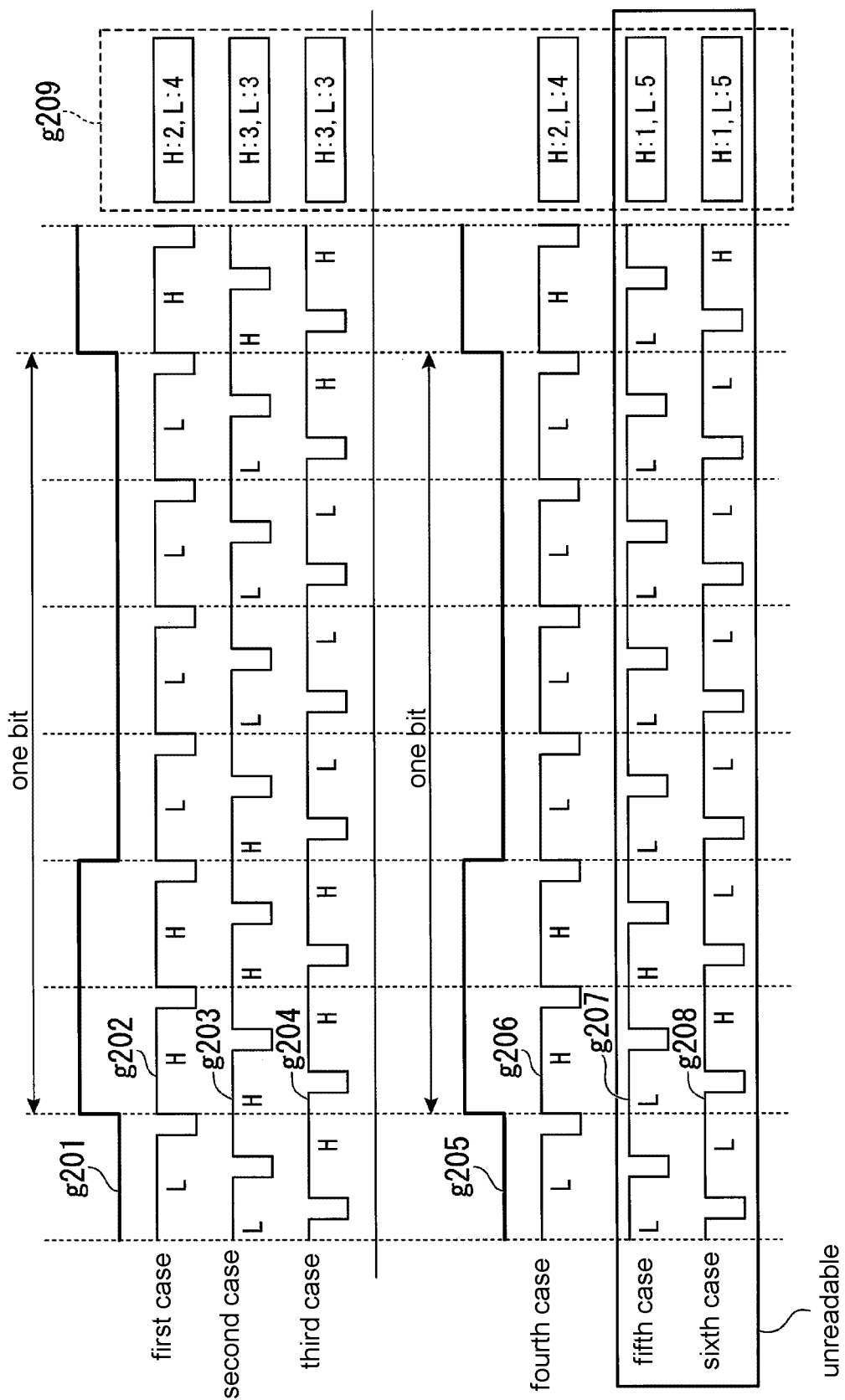
FIG. 9 is a diagram illustrating an example of determination of light-off and light-on of a light emission pattern of "0" according to an embodiment.

FIG. 9 is a diagram illustrating an example of determination of light-off and light-on of the light emission pattern of "0" according to the present embodiment. FIG. 10 is a diagram illustrating an example of determination of light-off and light-on of the light emission pattern of "1" according to the present embodiment. FIG. 11 is a diagram showing an example of determination standards according to the present embodiment. In FIG. 9 and FIG. 10, the horizontal axis represents elapsed time, and the vertical axis represents signal level (the H level and the L level).

Figure 10:
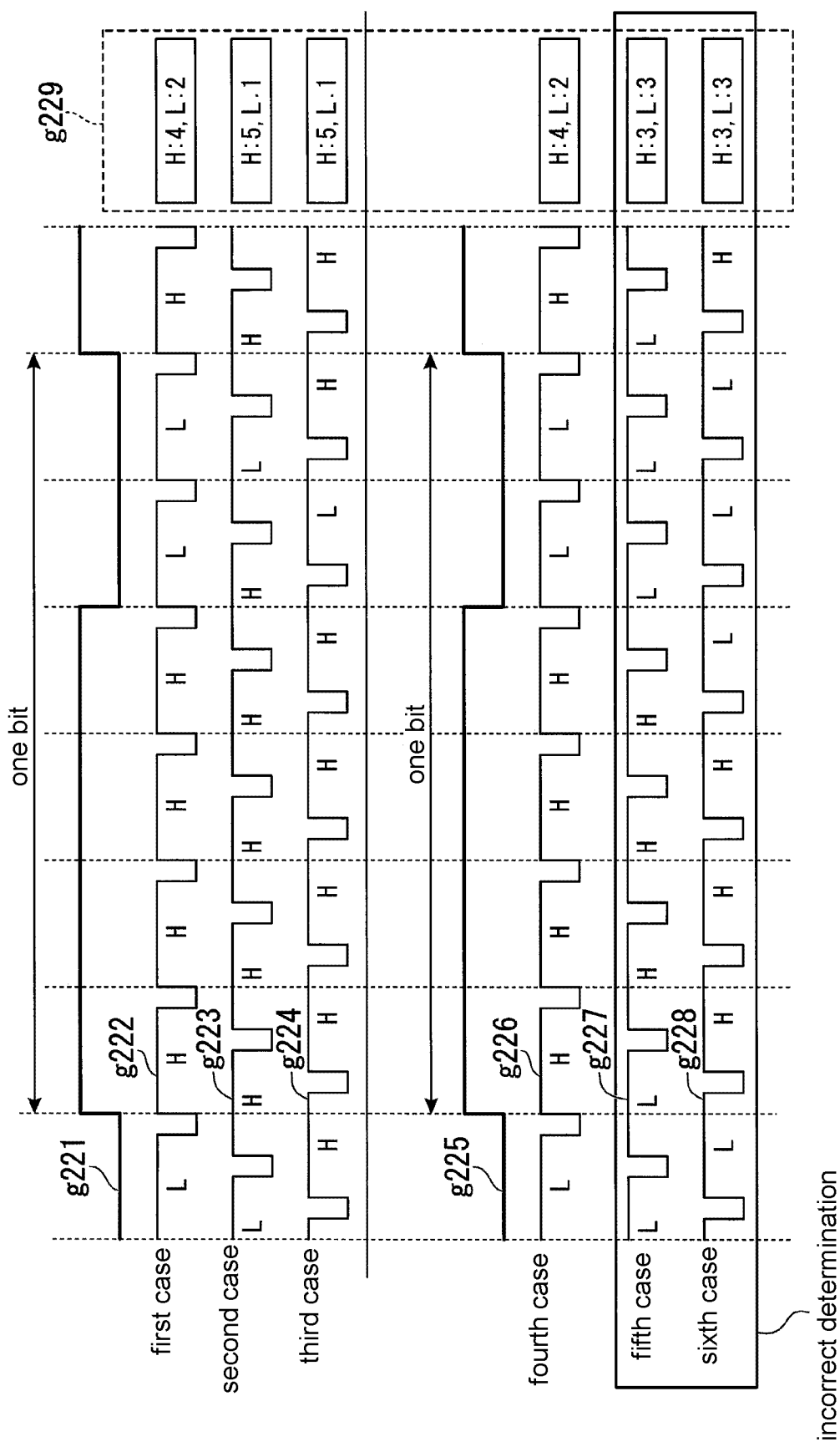
FIG. 10 is a diagram illustrating an example of determination of light-off and light-on of a light emission pattern of "1" according to an embodiment.

In addition, in FIG. 9 and FIG. 10, reference symbols g201, g205, g221, and g225 represent light-on and light-off of the light emitting part 24. Reference symbols g202 and g222 represent exposure timings of an imaging device in a first case. Reference symbols g203 and g223 represent exposure timings of the imaging device in a second case. Reference symbols g204 and g224 represent exposure timings of the imaging device in a third case. Reference symbols g206 and g226 represent exposure timings of the imaging device in a fourth case. Reference symbols g207 and g227 represent exposure timings of the imaging device in a fifth case. Reference symbols g208 and g228 represent exposure timings of the imaging device in a sixth case. The range represented by reference symbols g209 and g229 indicates determination results of the H level and the L level.

Further, FIG. 9 and FIG. 10 illustrate examples in which an exposure time is $5/6$ units. The exposure time and exposure timings are controlled by the exposure controlling part 321 of the receiver 3. In addition, an allowable range of a deviation in frequencies of frame rates of the light emitting part 24 and the photographing part 31 is 98.33 to 101.66 ($\pm 1.66\%$) if a rate of the photographing part is set to 100. However, FIG. 9 and FIG. 10 are diagrams of a case where frequencies of frame rates of the light emitting part 24 and the photographing part 31 completely match.

In addition, in FIG. 9 and FIG. 10, the first to the third cases are high sensitivity determination examples. Further, high sensitivity determination refers to a case where white determination sensitivity when a captured image is binarized is high (which means an image with a slight amount of incident light is determined to be white) or a case where an amount of incident light to an element is large. In the first to the third cases of FIG. 9 and FIG. 10, a case with incident light in $1/6$ units or more during the exposure time of $5/6$ units is determined to be the H level.

In addition, the fourth to the sixth cases are low sensitivity determination examples. Further, low sensitivity determination refers to a case where white determination sensitivity when a captured image is binarized is low (which means an image with a large amount of incident light is determined to be white) or a case where an amount of incident light to an element is small. In the fourth to the sixth cases of FIG. 9 and FIG. 10, a case with incident light in the entire ⅚ units during the exposure time of ⅚ units is determined to be the H level.

The first case for high sensitivity determination represented by reference symbols g202 and g222 is an example in which the rising timing of the light emitting part 24 and the rising timing of the exposure time match. In the first case, it is determined that there are two occasions of light-on (the H level) and four occasions of light-off (the L level) of the light emission pattern of "0" as represented by reference symbol g202. In the first case, it is determined that there are four occasions of light-on (the H level) and two occasions of light-off (the L level) of the light emission pattern of "1" as represented by reference symbol g222.

The second case for high sensitivity determination represented by reference symbols g203 and g223 is an example in which the rising timing of the light emitting part 24 and the rising timing of the exposure time have advanced ⅖ units (120 [degrees]). As represented by reference symbol g203 in the second case, it is determined that there are three occasions of light-on (the H level) and three occasions of light-off (the L level) of the light emission pattern of "0." As represented by reference symbol g223 in the second case, it is determined that there are five occasions of light-on (the H level) and one occasion of light-off (the L level) of the light emission pattern of "1."

The third case for high sensitivity determination represented by reference symbols g204 and g224 is an example in which the rising timing of the light emitting part 24 and the rising timing of the exposure time have advanced ⅘ units (240 [degrees]). As represented by reference symbol g204 in the third case, it is determined that there are three occasions of light-on (the H level) and three occasions of light-off (the L level) of the light emission pattern of "0." As represented by reference symbol g224 in the third case, it is determined that there are five occasions of light-on (the H level) and one occasion of light-off (the L level) of the light emission pattern of "1."

The fourth case for low sensitivity determination represented by reference symbols g206 and g226 is an example in which the rising timing of the light emitting part 24 and the rising timing of the exposure time match. As represented by reference symbol g206 in the fourth case, it is determined that there are two occasions of light-on (the H level) and four occasions of light-off (the L level) of the light emission pattern of "0." As represented by reference symbol g226 in the fourth case, it is determined that there are four occasions of light-on (the H level) and two occasion of light-off (the L level) of the light emission pattern of "1."

The fifth case for low sensitivity determination represented by reference symbols g207 and g227 is an example in which the rising timing of the light emitting part 24 and the rising timing of the exposure time have advanced ⅖ units (120 [degrees]).

As represented by reference symbol g207 in the fifth case, it is determined that there are one occasion of light-on (the H level) and five occasions of light-off (the L level) of the light emission pattern of "0." Thus, since the light emission pattern of "0" in the fifth case has one occasion of the H level, unreadable ID is determined.

As represented by reference symbol g227 in the fifth case, it is determined that there are three occasions of light-on (the H level) and three occasions of light-off (the L level) of the light emission pattern of "1." Thus, since the light emission pattern of "1" in the fifth case has three occasions of the H level, 0 is determined, which is incorrect determination.

The sixth case for low sensitivity determination represented by reference symbols g208 and g228 is an example in which the rising timing of the light emitting part 24 and the rising timing of the exposure time deviate ⅘ units (240 [degrees]).

As represented by reference symbol g208 in the sixth case, it is determined that there are one occasion of light-on (the H level) and five occasions of light-off (the L level) of the light emission pattern of "0." Thus, since the light emission pattern of "0" in the sixth case has one occasion of the H level, unreadable ID is determined.

As represented by reference symbol g228 in the sixth case, it is determined that there are three occasions of light-on (the H level) and three occasions of light-off (the L level) of the light emission pattern of "1." Thus, since the light emission pattern of "1" in the sixth case has three occasions of the H level, 0 is determined, which is incorrect determination.

Next, determination standards stored in the storage part 323 will be described.

Further, in order to avoid description being complicated, decoding process of main data except processing of the above-described sub data will be described here.

In a case where the number of H levels is 0, the decoder 325 of the receiver 3 regards the main data as a start bit or as unreadable ID (identification information) (not possible) due to the insufficient light amount or the like as shown in FIG. 11. In a case where the number of H levels is one, the decoder 325 regards the main data as unreadable ID (identification information) (not possible) due to the insufficient light amount or the like. In addition, in a case where the number of H levels is two or more and three or less, the decoder 325 regards the main data as "0." In a case where the number of H levels is four or more and five or less, the decoder 325 regards the main data as "1." In a case where the number of H levels is six, the decoder 325 regards the main data as unreadable ID (identification information) (not possible) due to the excessive light amount or the like or that there is a light source other than the light emitting part 24. These determination standards are stored in the storage part 323 of the receiver 3. Further, the determination standards shown in FIG. 11 are applied to a case where one bit is 6 units. Thus, in a case where one bit is units other than 6 units, determination standards are set in accordance with the number of units of one bit.

As described above, for the light emission pattern of "0" and the light emission pattern of "1" of the first to the fourth cases, "0" or "1" is appropriately determined on the basis of the determination standards shown in FIG. 11. Since there is one occasion of the H level of the light emission pattern of "0" in the fifth and the sixth cases, unreadable ID is determined.

In addition, since there are three occasions of the H level of the light emission pattern of "1" in the fifth and the sixth cases, 0 is determined, which is incorrect determination. Further, in the fifth and the sixth cases, for example, it is identified as indecipherable signal sequences in accordance with the odd parity.

Next, an example in which an image captured by the receiver 3 is processed will be described.

Figure 12:
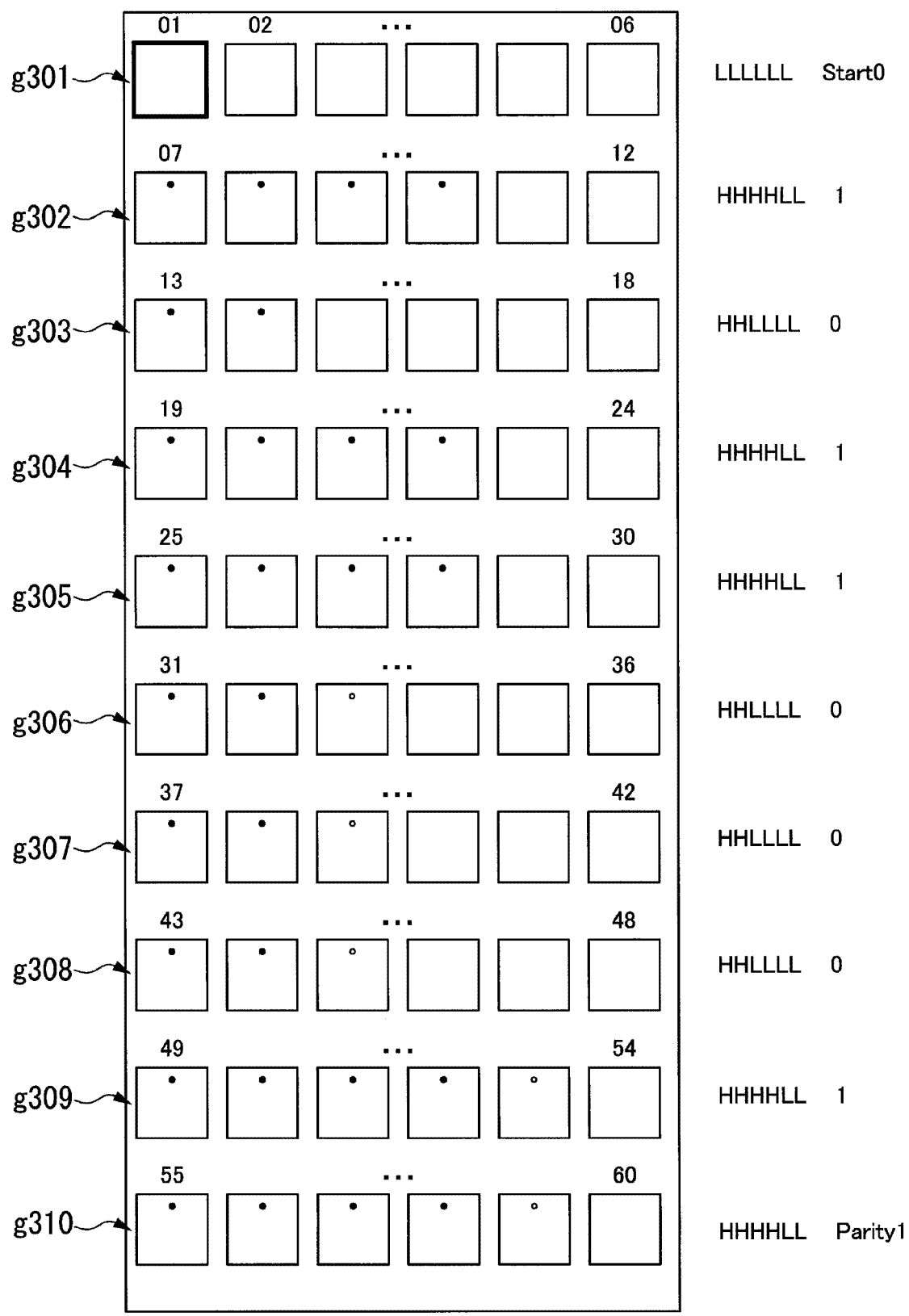
FIG. 12 is a diagram for explaining a process to be performed on captured images according to an embodiment.

FIG. 12 is a diagram for explaining a process to be performed on captured images according to the present embodiment. Further, in the example illustrated in FIG. 12, the data bit has 8 bits. The photographing part 31 of the receiver 3 captures six images of light emission patterns per bit and thus captures a total of 60 images of light emission patterns for 10(=1+8+1) bits. Further, in FIG. 12, white and black are reversed.

In addition, the images (01 to 06) of the area represented by reference symbol g301 are images obtained by capturing the light emission pattern of the start bit. The images (07 to 12, 13 to 18, 19 to 24, 25 to 30, 31 to 36, 37 to 42, 43 to 48, 49 to 54, 55 to 60) of the areas represented by reference symbols g302 to g309 are images obtained by capturing light emission patterns of the first bit to the eighth bit.

The first unit (01) is L, the second unit (02) is L, . . . , and the sixth unit (06) is L. Thus, the determining part 324 of the receiver 3 determines that the first to the sixth units are a start bit.

Next, the determining part 324 makes determination in order from the first unit (07) of the first bit of the data bit to the sixth unit (12). The determining part 324 determines "1" for the bit due to HHHHLL, that is, four H's.

Next, the determining part 324 makes determination in order from the first unit (13) of the second bit of the data bit to the sixth unit (18). The determining part 324 determines "0" for the bit due to HHLLLL, that is, two H's.

Then, the determining part 324 makes determination in order from the third bit to the eighth bit.

Next, the determining part 324 makes determination in order from the first unit (55) to the sixth unit (60) represented by reference symbol g310. The determining part 324 determines "1" for the bit due to HHHHLL, that is, four H's.

Further, next to reference symbol g310, the determining part 324 determines the previous bit of the start bit as a parity bit when the light emission pattern of LLLLLL represented by reference symbol g301 that is, the start bit, is received. Alternatively, in a case where a length of the data bit is determined in advance, the determining part 324 determines the bit added after a predetermined data bit as a start bit.

Since the light emission patterns are captured in the consecutive images as bright spots (black spots in FIG. 12) as illustrated in FIG. 12, the processing part 32 determines H or L for these images and then determines "0" or "1" for each bit. In addition, the processing part 32 of the receiver 3 can decode data included in beacon signals using the determination result.

Further, in the present embodiment, the transmitter 2 transmits the beacon signals at the timings of the transmitter 2 as described above. In addition, the receiver 3 decodes transmission data of images without using a synchronization signal from the transmitter 2. The reason that the receiver 3 performs decoding on the images without using a synchronization from the transmitter 2 as described above is that a configuration of a signal sequence of the beacon signals (the main data set) includes multiple units for one bit and is defined by a combination of light emission at the H level and the L level (HHLLLL for the light emission pattern of "0" and HHHHLL for the light emission pattern of "1"). In addition, the reason that the receiver 3 performs decoding on the images without using a synchronization from the transmitter 2 is that the transmission data is composed of data bits (n bits), a start bit (one bit), and a parity bit (1 bit).

Further, although accuracy in position identification in the present embodiment depends on the number of installed transmitters 2 and the number of pixels of the photographing part 31 of the receiver 3, for example, 20 cm or shorter is possible.

Image Processing Procedure

Next, an example of the procedure for image processing performed by the processing part 32 of the receiver 3 will be described.

Figure 13:
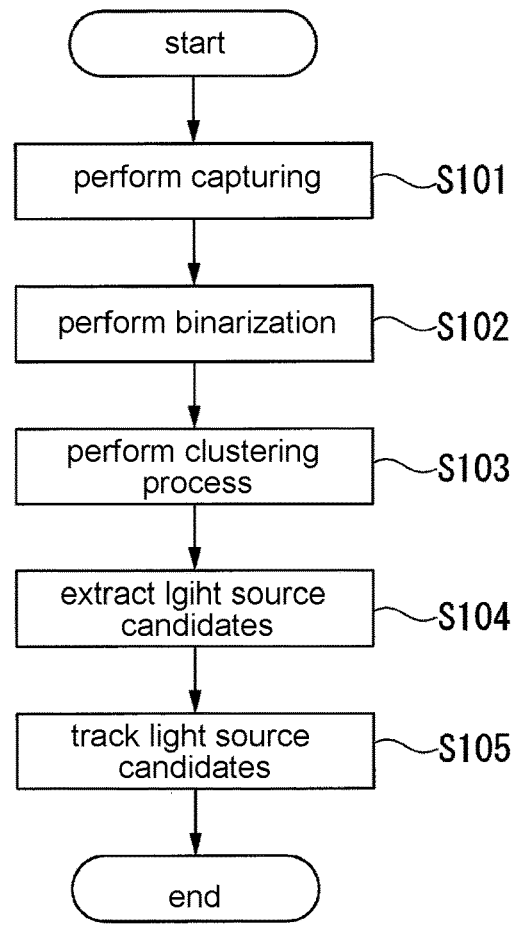
FIG. 13 is a flowchart of the procedure for an image processing performed by a processing part of a receiver according to an embodiment.

FIG. 13 is a flowchart of the procedure for image processing performed by the processing part 32 of the receiver 3 according to the present embodiment.

(Step S101) The photographing part 31 performs capturing under control of the exposure controlling part 321.

(Step S102) The image processing part 322 binarizes the captured multi-value (e.g., 256 levels of grayscale) image.

(Step S103) The image processing part 322 performs a clustering process on the binarized image. Further, the image processing part 322 adds attributes such as the number of pixels, an aspect ratio, and a filling rate to each of clusters that are subject to the clustering process. Further, the image processing part 322 performs the clustering process on, for example, the number of pixels that is greater than or equal to a threshold stored in the storage part 323.

(Step S104) The image processing part 322 extracts an image in a candidate area for a light source on the basis of the result of the clustering process. Further, the image processing part 322 extracts light source candidates on the basis of the attributes added in Step S103.

(Step S105) The image processing part 322 tracks the light source candidates if the light source candidates are accumulated in a sequence. Further, the image processing part 322 causes necessary data for the tracking to be stored in the storage part 323. For example, the image processing part 322 searches frames after six frames, for example, assumes similar light sources located nearby (e.g., 5 pixels×5 pixels) as the same light source, and extracts signal intensities thereof. The image processing part 322 excludes intensities that are inappropriate for the H level and the L level from the signal candidates. With reference to the light sources found later after the current time, the image processing part 322 repeats searching for a light source thereafter until no light sources are found.

Thereafter, the determining part 324 determines the H level and the L level on the basis of the result of the image processing. Then, the determining part 324 determines the light emission pattern of "0" or the light emission pattern of "1" on the basis of the number of H levels in one bit. Next, the decoder 325 verifies a length of the signal sequences tracked by the image processing part 322, corrects the signals using error correction or an error detection signal if necessary, and obtains the transmission information.

Further, the above-described procedure for image processing is an example and is not limited thereto. The image processing part 322 may perform a process, for example, edge detection, feature value detection, or the like in image processing.

Calculation Method for Direction

Next, a calculation method for a direction of a beacon signal performed by the receiver 3 will be described using FIG. 14 and FIG. 15.

Figure 14:
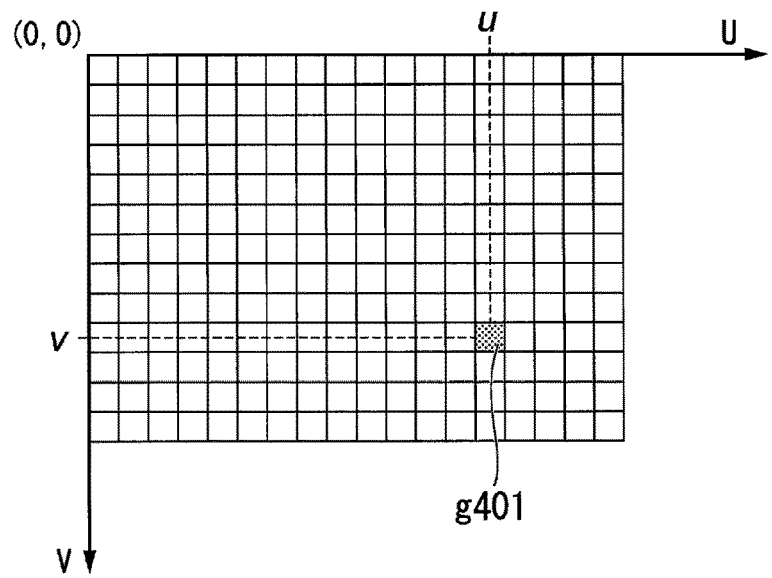
FIG. 14 is a diagram illustrating coordinates of a captured image according to an embodiment.

FIG. 14 is a diagram illustrating coordinates of a captured image according to the present embodiment. In FIG. 14, the horizontal direction is assumed as a U axis direction, and the vertical direction is assumed as a V axis direction. Reference symbol g401 represents a bright spot of a beacon signal in a captured image. Coordinates (u, v) of the bright spot of the beacon signal will be referred to as bright spot coordinates below.

In the present embodiment, the processing part 32 of the receiver 3 calculates the direction in which the beacon signal is transmitted (azimuth $\omega$, elevation $\theta$) from the bright spot coordinates (u, v). Further, when calculating the direction of the beacon signal, the direction calculating part 327 uses calibration data stored in the CAL data storage part 326.

Figure 15:
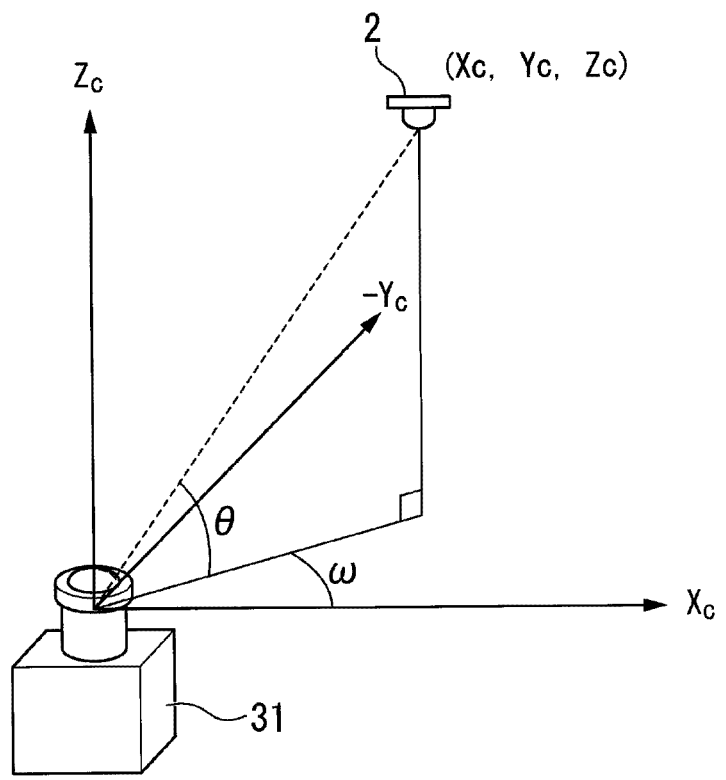
FIG. 15 is a diagram illustrating camera coordinates according to an embodiment.

FIG. 15 is a diagram illustrating camera coordinates according to the present embodiment.

The origin of camera coordinates is assumed as a camera optical center as illustrated in FIG. 15. As an example, an object-side principal point is set in the optical system composed of a plurality of lenses. Furthermore, camera coordinate axes are assumed as Xc, Yc, and Zc. In addition, the camera coordinate is a left-hand system in which −Yc direction is a front side of the photographing part 31 and a moving object front side, and +Zc direction is a ceiling direction.

The bright spot coordinates (u, v) (FIG. 14) are converted into a point on the camera coordinate by using an internal parameter and lens distortion correction data. A relation between the bright spot coordinates (u, v) of the beacon signal and the coordinates (Xc, Yc, Zc) of the beacon signal in the camera coordinate system (which will be referred to as beacon coordinates below) is expressed by the following formula (1).

$$S \begin{bmatrix} u \\ v \\ 1 \end{bmatrix} = \begin{bmatrix} fx & 0 & Cx \\ 0 & fy & Cy \\ 0 & 0 & 1 \end{bmatrix} \begin{bmatrix} Xc \\ Yc \\ Zc \end{bmatrix} \quad (1)$$

In the formula (1), (fx, fy) represents a focal distance in pixel units, (Cx, Cy) represents an optical center (principal point) in pixel units, and S represents a scale factor. Radial and circumferential distortion of the camera lenses is reflected in Xc, Yc, and Zc.

If the formula is extended in the camera coordinate system using a radial distortion coefficient k and a circumferential distortion coefficient p, it can be expressed by the following formula (2).

$$Xc = x'(1 + k_1 r^2 + k_2 r^4 + k_3 r^6) + 2p_1 x' y' + p_2(r^2 + 2x'^2) \quad (2)$$

$$Yc = y'(1 + k_1 r^2 + k_2 r^4 + k_3 r^6) + p_1(r^2 + 2y'^2) + 2p_2 x' y'$$

Where $r^2 = x'^2 + y'^2$, $x' = \frac{x}{z}$, $y' = \frac{y}{z}$

In the formula (2), the term $x'(1+k_1r^2+k_2r^4+k_3r^6)$ in Xc and the term $y'(1+k_1r^2+k_2r^4+k_3r^6)$ in Yc represent radial distortion among distortion components caused by the lenses of the photographing part 31. In addition, the term $\{2p_1x'y'+p_2(r^2+2x'^2)\}$ in Xc and the term $\{p_1(r^2+2y'^2)+2p_2x'y'\}$ in Yc represent circumferential distortion among the distortion components caused by the lenses of the photographing part 31.

The direction calculating part 327 performs camera calibration on a calibration target using, for example, a standard image and a disposition pattern of the transmitters 2. In addition, the direction calculating part 327 compares theoretical imaging coordinates corresponding to known coordinates with actually captured coordinates and determines a k value and p value. Accordingly, according to the present embodiment, influence on the camera coordinates with which lens distortion is calculated can be removed, and thus subsequent self-position calculation can be performed with accuracy.

The direction of the beacon signal (azimuth ω, elevation θ) in the camera coordinate system can be expressed by the following formula (3).

$$\omega = \tan^{-1}\left(\frac{Yc}{Xc}\right) \quad (3)$$

$$\theta = \tan^{-1}\left(\frac{Zc}{\sqrt{Xc^2 + Yc^2}}\right)$$

Calculation Method for Self-Position

Next, a calculation method for a self-position performed by the receiver 3 will be described using FIG. 16 to FIG. 18.

Figure 16:
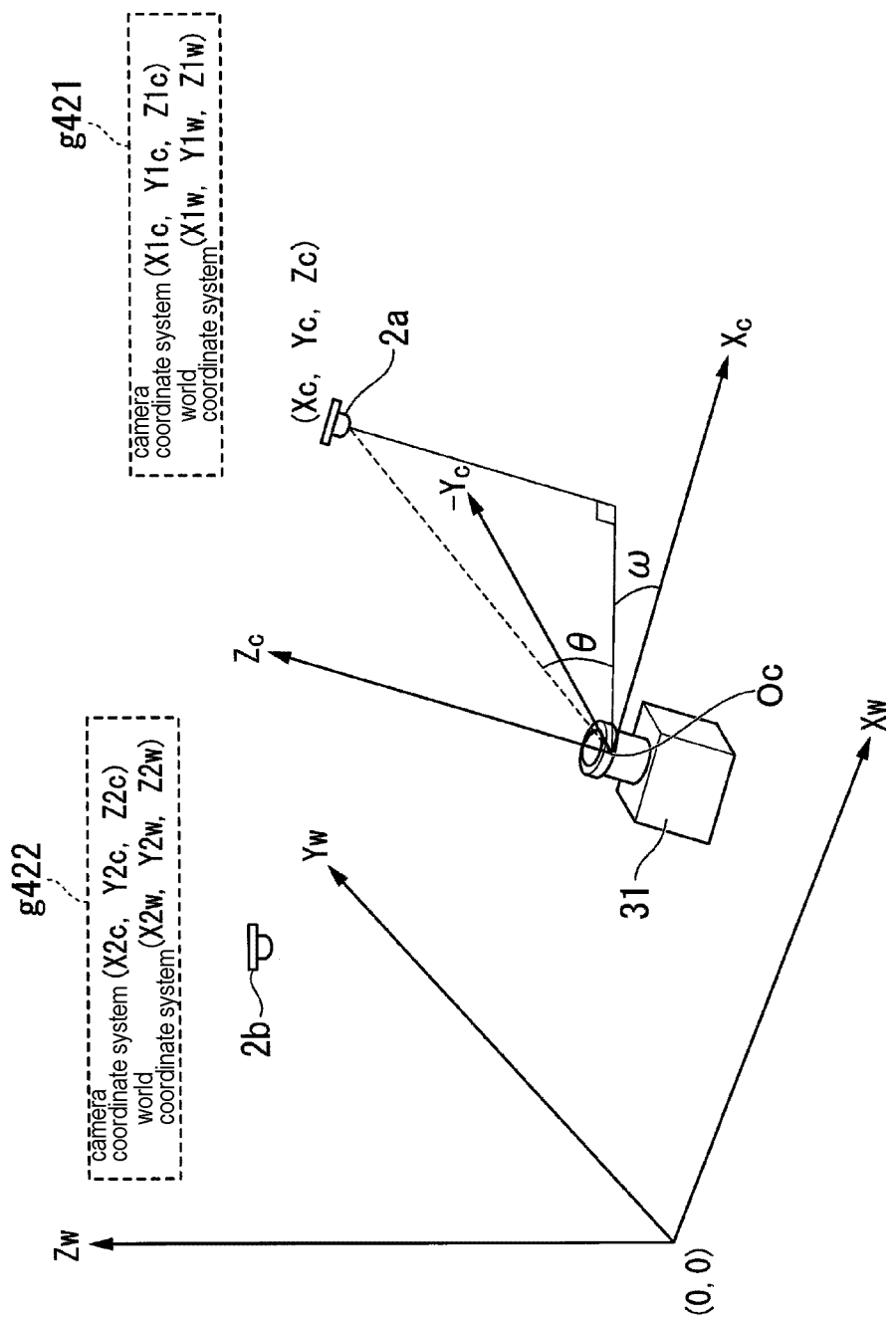
FIG. 16 is a diagram illustrating camera coordinates and world coordinates according to an embodiment.

FIG. 16 is a diagram illustrating camera coordinates and world coordinates according to the present embodiment. For FIG. 16, description will be provided using two transmitters 2a and 2b. (Xw, Yw, Zw) is a world coordinate system, and (Xc, Yc, Zc) is a camera coordinate system. Reference symbol g421 represents coordinates (X1c, Y1c, Z1c) of the transmitter 2a in the camera coordinate system coordinates and (X1w, Y1w, Z1w) of the transmitter 2a in the world coordinate system. Reference symbol g422 represents coordinates (X2c, Y2c, Z2c) of the transmitter 2b in the camera coordinate system and coordinates (X2w, Y2w, Z2w) of the transmitter 2b in the world coordinate system. In addition, coordinates of the origin Oc of the camera coordinate system in the world coordinate system are assumed as $(t_1, t_2, t_3)$.

If the beacon coordinates in the camera coordinate system calculated in the formula (1) and the known beacon coordinates in the world coordinate system are used multiple times, a rotation matrix and a translation matrix are obtained. Therefore, a self-position on a known map using the world coordinate system can be calculated.

Here, a transformation from the camera coordinate system to the world coordinate system is performed using a 3D affine transformation. Each of values of a transformation matrix used in this transformation can be calculated if the number of necessary beacon signals to be referred to is secured. However, values are limited to only X, Y, and θz that are necessary for position identification in the embodiment, and other parameters are obtained from sensors or set to fixed values.

A relation between the world coordinates and the camera coordinates can be expressed by the following formula (4) using a rotation matrix composed of elements $r_{nm}$ and a translation matrix composed of elements $t_n$.

$$\begin{bmatrix} Xw \\ Yw \\ Zw \\ 1 \end{bmatrix} = \begin{bmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{bmatrix} \begin{bmatrix} Xc \\ Yc \\ Zc \\ 1 \end{bmatrix} \quad (4)$$

$r_{11}$ to $r_{33}$ serving as rotation matrix elements are assumed as variables in a case where the camera coordinates are rotated by α around the Xw axis, β around the Yw axis, and γ around the Zw axis in the world coordinate system.

Here, α and β can be acquired using gravity values from an inertial sensor built in, for example, a moving object or the photographing part 31. In addition, $t_3$ can also be acquired from a distance sensor with respect to a floor.

As a result, variables that should be obtained for position identification are $t_1(X)$, $t_2(Y)$, and a rotation angle $\gamma(\theta Z)$ around the Zw axis.

Here, since the beacon coordinates in the world coordinate system is known, a capturing position and direction of the photographing part 31 can be obtained (identification of a self-position and a direction) by solving simultaneous equations using a plurality of transmitters 2.

Figure 17:
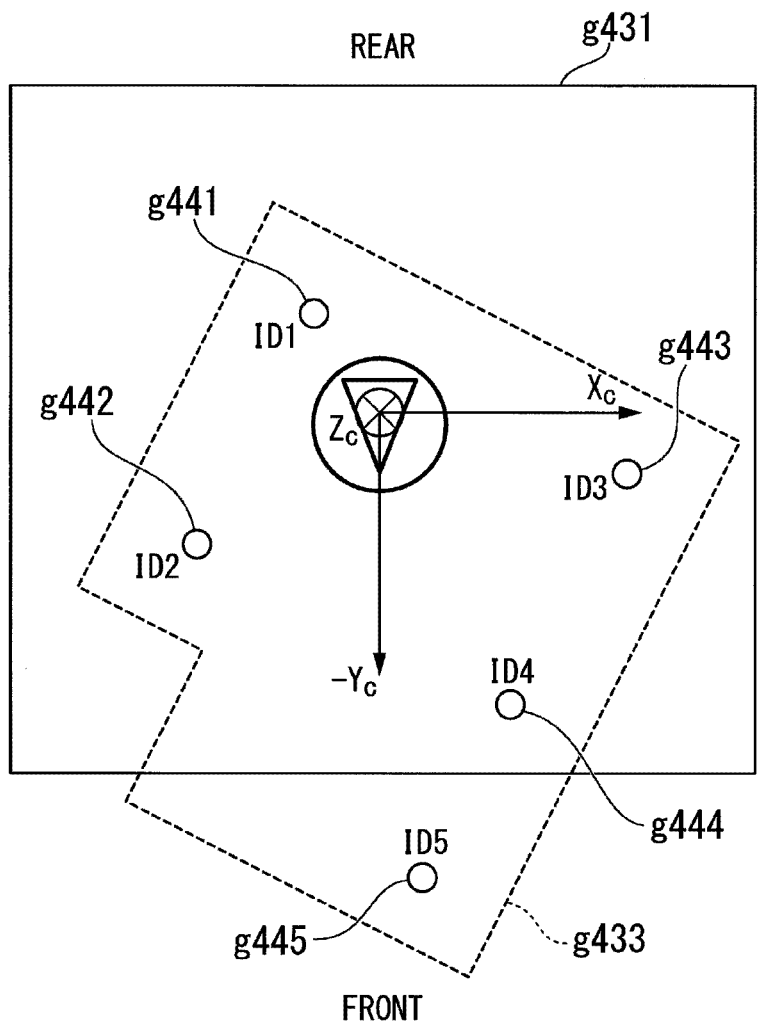
FIG. 17 is a diagram illustrating an image in which light from a plurality of transmitters attached to a ceiling has been captured.

FIG. 17 is a diagram illustrating an image in which light from a plurality of transmitters 2 attached to a ceiling has been captured. The area represented by reference symbol g431 is an image captured by the photographing part 31. The area represented by reference symbol g433 represents an outline of a room having the ceiling with the transmitters 2 attached thereto. In addition, reference symbols g441 to g445 represent beacon signals transmitted by each of the transmitters 2. In addition, the receiver 3 decodes received transmission data and obtains IDI which is the ID (identification information) of the transmitter 2 represented by reference symbol g441, ID2 which is the ID of the transmitter 2 represented by reference symbol g442, ID3 which is the ID of the transmitter 2 represented by reference symbol g443, and ID4 which is the ID of the transmitter 2 represented by reference symbol g444. In the example of FIG. 17, the receiver 3 does not acquire the ID represented by reference symbol g445 since it is out of the capturing range.

The position of each of the transmitters 2 in the world coordinate system is known as described above. In addition, the receiver 3 acquires the ID of the transmitter 2 from which the receiver 3 has been able to receive the beacon signals from the transmission data and calculates and obtains the direction. Furthermore, each self-position is identified from positions of the plurality of transmitters 2. As a result, the position of the receiver 3 in the world coordinate system is identified as illustrated in FIG. 17. Further, in FIG. 17, the upper side of the paper is assumed as a rear side (REAR) of the receiver 3 and the lower side of the paper is assumed as a front side (FRONT) of the receiver 3.

Figure 18:
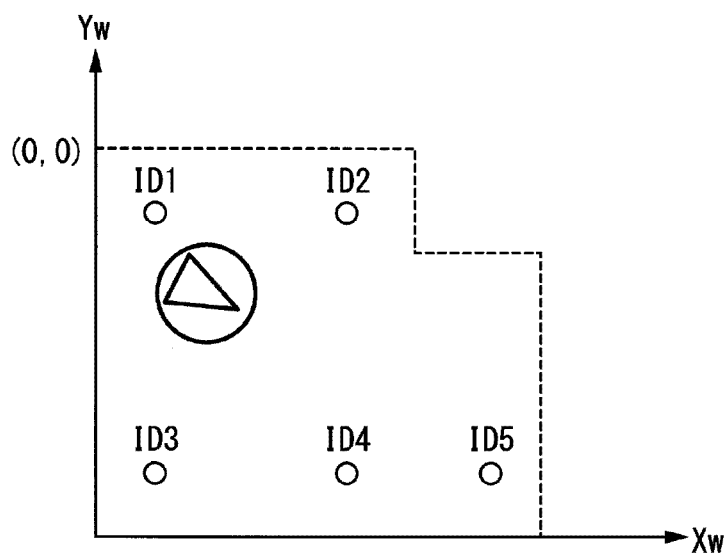
FIG. 18 is a diagram illustrating self-positions on a map according to an embodiment.

The receiver 3 converts the identified self-positions into coordinates on the map as illustrated in FIG. 18. FIG. 18 is a diagram illustrating self-positions on a map according to the present embodiment. In FIG. 18, the horizontal axis represents X axis, and the vertical axis represents Y axis. In addition, the example illustrated in FIG. 18 is of a case where the four transmitters 2 were captured and IDs thereof were acquired. Further, the transmitter 2 with the ID5 (represented by reference symbol g445 in FIG. 17) was not captured since it was out of the capturing range. The self-positions in the example illustrated in FIG. 18 are, for example, Xw=2855, Yw=3140, and θz=303 degrees.

As described above, according to the present embodiment, the coordinates and directions of the self-positions can be instantly acquired if the receiver 3 is activated and images are captured. In addition, according to the present embodiment, a map associated with the IDs of the transmitters 2 illustrated in FIG. 18 can be acquired.

Procedure for Position Identification Process

Next, an example of the procedure for a position identification process performed by the receiver 3 will be described.

Figure 19:
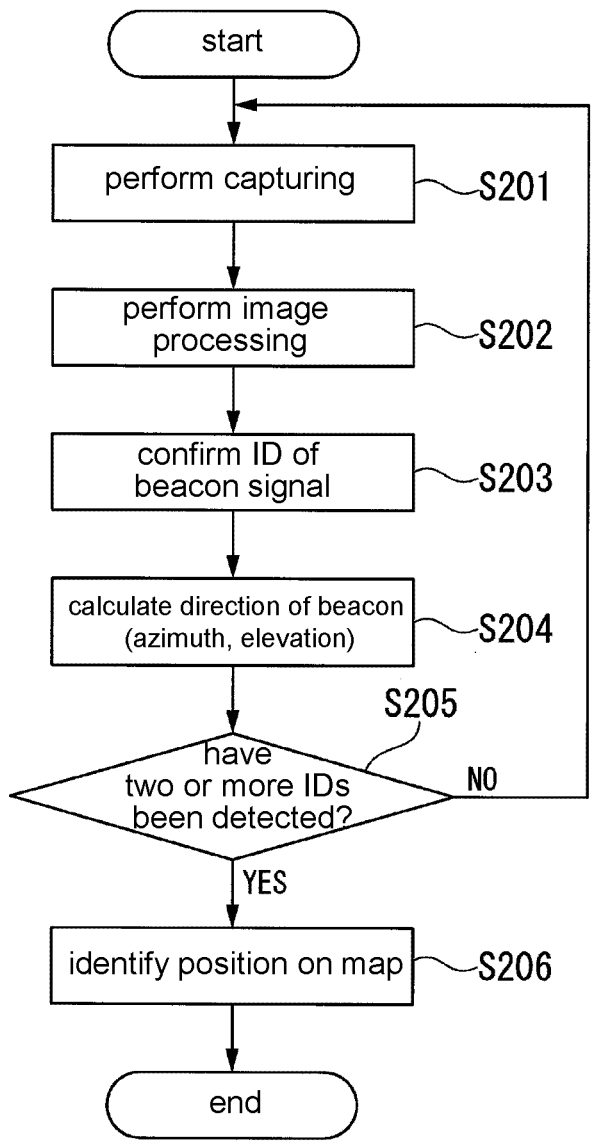
FIG. 19 is a flowchart of the procedure for a position identification process performed by a receiver according to an embodiment.
Figure 20:
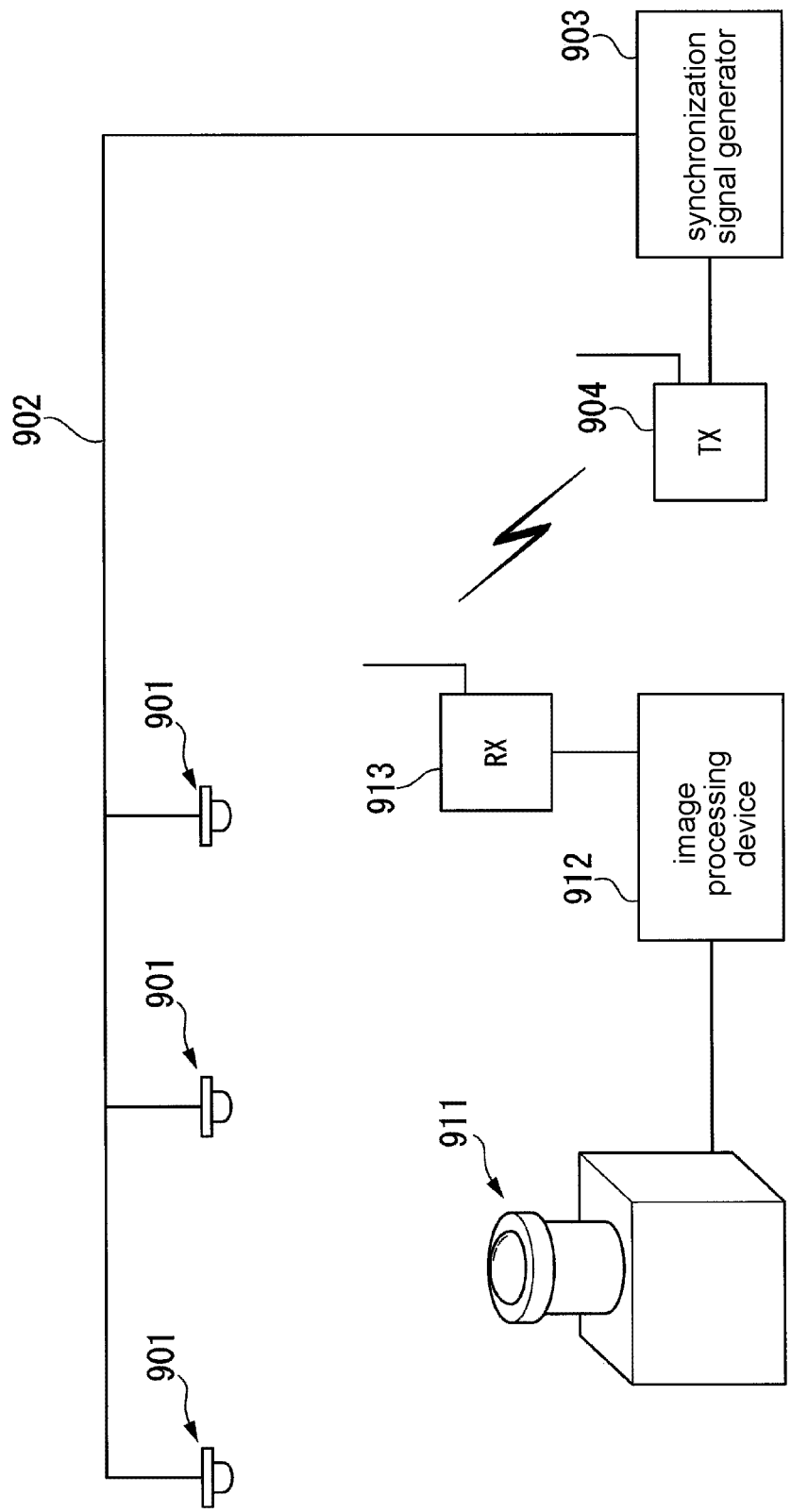
FIG. 20 is a diagram illustrating a configuration example of the related art.

FIG. 19 is a flowchart of the procedure for a position identification process performed by the receiver 3 according to the present embodiment.

(Step S201) The photographing part 31 performs capturing under control of the exposure controlling part 321.

(Step S202) The image processing part 322 performs image processing (Steps S102 to S105 in FIG. 13) on the captured image.

(Step S203) The determining part 324 performs a determination process and confirms an image of beacon signals on the basis of information output by the image processing part. Next, the decoder 325 extracts transmission data including IDs from the beacon signals. Accordingly, the decoder 325 confirms the IDs of the beacon signals.

(Step S204) The direction calculating part 327 confirms positions of the beacon signals (beacon coordinates) in the camera coordinate system using the information output by the image processing part, calibration information stored in the CAL data storage part 326, and the above-described formulas (1) and (2). Next, the direction calculating part 327 calculates directions of the beacon signals (the directions of the transmitters 2 viewed from the photographing part 31) with the above-described formula (3) using the information output by the image processing part.

(Step S205) The self-position calculating part 329 acquires the transmission data output by the decoder 325. Next, the self-position calculating part 329 determines whether two or more IDs have been detected. The self-position calculating part 329 proceeds to the process of Step S206 if it is determined that two or more IDs have been detected (YES in Step S205). The self-position calculating part 329 returns to the process of Step S201 if it is determined that two or more IDs have not been detected (NO in Step S205).

(Step S206) The self-position calculating part 329 acquires the detection result output by the photographing part 31 and the direction information output by the direction calculating part 327. Next, the self-position calculating part 329 calculates and identifies self-positions of the transmitters 2 with the above-described formula (4) using the detection result, the direction information, and map data stored in the map data storage part 328.

As described above, optical signals of point light sources are used as beacon signals serving as references for positioning in the present embodiment. A plurality of beacon signals of the present embodiment is installed in known coordinates with unique IDs (identification information). In the present embodiment, identification of the respective beacon signals and an azimuth from the photographing part 31 are set to be acquired by capturing the beacon signals using the photographing part 31. In addition, in the present embodiment, a current self-position (camera capturing position) is set to be inferred from the capturing data and coordinate data of the existing beacon signals (beacon coordinates).

According to the present embodiment, since there is no influence of multi-pass such as radio waves at places other than mirror surfaces by using light as beacon signals, calibration for individual installation environments is unnecessary after installation. In addition, according to the present embodiment, it is not likely to receive interference with other devices like radio waves and influence of noise.

In the present embodiment, six units are allocated to one bit of the transmission data, for example, as described above. In addition, in the present embodiment, by capturing the transmission data using the photographing part 31 at a one-unit frame rate and performing image processing thereon, perfect matching of the carrier frequency of the transmitters 2 with the frame rate of the light photographing part 31 and synchronization of shutter timings (phase matching) are unnecessary.

In addition, in the present embodiment, the transmission data has a total of n+2 bits including, for example, one bit of a start bit and one bit of a parity bit in addition to n bits of a data bit.

In addition, in the present embodiment, in data decoding, a plurality of consecutively captured images is determined to be the H level or the L level for every one unit using luminance of the light emitting part 24, and further "0" or "1" is determined for every one bit on the basis of the determination standards.

Accordingly, according to the present embodiment, completely asynchronous operations between the transmitters 2 and between the transmitter 2 and the receiver 3 are possible, and thus a synchronization signal line and a synchronous signal generator for connecting the transmitters and receivers are unnecessary. In addition, according to the present embodiment, if there is a plurality of transmitters 2, a reduction in installation costs is realized only with connection of power supply lines, driving with an independent power supply is also possible using a battery of the transmitters 2 depending on an application, and preliminary installation is possible only for events, and therefore easier installation is realized.

In addition, according to the present embodiment, by employing a signal format oversampled by six times (one bit is six units), while using intermittent sampling data (e.g., images captured by the photographing part 31), communication between the transmitters 2 and the receiver with asynchronous and approximate carrier frequencies can be realized.

Further, a program for realizing all or some of the functions of the transmitters 2 of the disclosure may be recorded in a computer-readable recording medium, and all or some of processing performed by the transmitters 2 may be performed by causing the program recorded on the recording medium to be read and executed by a computer system. Further, the "computer system" mentioned here is assumed to include an OS and hardware such as peripheral devices. In addition, the "computer system" is assumed to include a WWW system with a homepage providing environment (or a display environment). In addition, the "computer-readable recording medium" refers to a portable medium such as a flexible disk, a magneto-optical disc, a ROM, or a CO-ROM, or a storage device such as a hard disk built in a computer system. Furthermore, the "computer-readable recording medium" is assumed to include a device storing a program for a given period of time, such as a volatile memory (RAM) in a computer system serving as a server or a client in a case where the program is transmitted through a network such as the Internet or a communication line such as a telephone line.

In addition, the program may be transmitted from the computer system with a storage device or the like storing the program to another computer system via a transmission medium or on a transmission wave of the transmission medium. Here, the "transmission medium" for transmitting the program refers to a medium having a function of transmitting information such as a network (communication network) such as the Internet or a communication line such as a telephone line. In addition, the program may realize some of the above-described functions. Furthermore, the program may be a so-called differential file (differential program) that can realize the above-described functions in combination with the program already recorded in the computer system.

In the optical transmitter according to an aspect of the disclosure, one bit of the transmission data may include a light-on period in which light is on for a predetermined time (one unit) and a light-off period in which light is off for the predetermined time.

In the optical transmitter according to an aspect of the disclosure, a light emission pattern of 0 of the transmission data may be a light emission pattern including a combination of a first predetermined light-on time with a first predetermined light-off time, and a light emission pattern of 1 of the transmission data may be a light emission pattern including a combination of a second predetermined light-on time that is different from the first predetermined light-on time, and a second predetermined light-off time that is different from the first predetermined light-off time.

In the optical transmitter according to an aspect of the disclosure, one bit of the transmission data may comprise the six predetermined times.

In the optical transmitter according to an aspect of the disclosure, the transmission data may include at least one of the light emission pattern of 0 and the light emission pattern of 1, the light emission pattern of 0 may be in the light-on state continuously for two predetermined times and then in the light-off state continuously for four predetermined times, and the light emission pattern of 1 may be in the light-on state continuously for four predetermined times and then in the light-off state continuously for two predetermined times.

In the optical transmitter according to an aspect of the disclosure, the transmission data may comprises a start bit in the light-off state or the light-on state in an entire predetermined time before the transmission information and a parity bit after the transmission information.

According to one or some embodiments of the disclosure, since the transmission data is generated with each bit of the transmission information in combination of the light-off state and the light-on state, asynchronous operations between transmitters and between the transmitter and a receiver are possible and a synchronization signal line and a synchronization signal generator for connecting the transmitters to each other and the transmitters to the receiver are not required.

In addition, according to one or some embodiments of the disclosure, even if a timing of the transmission data deviates from an exposure timing of the receiver side, the transmission data can be transmitted such that the receiver side can receive the transmission data without incorrect determination.

In addition, according to one or some embodiments of the disclosure, since the start bit is provided to be in the light-off state or the light-on state in an entire predetermined time, the transmission data can be transmitted such that the receiver side can find the start position of the transmission information included in the transmission data. In addition, according to one or some embodiments of the disclosure, since the parity bit is provided, the transmission data can be transmitted such that the receiver side can determine whether data has been successfully received using the parity bit.

Although the embodiment for implementing the disclosure has been described, the disclosure is not limited to the embodiment and various modifications and substitutions can be added thereto within a scope not departing from the gist of the disclosure.

What is claimed is:

1. An optical transmitter comprising:
a transmitter; and
a hardware processor coupled to the transmitter and configured to:
generate transmission information including identification information unique to a device and composed of a plurality of bits and generating transmission data with each bit of the generated transmission information in combination of a light-off state and a light-on state; and
transmit, via the transmitter, a unique beacon signal by controlling the light-on state and the light-off state of a light emitting part in accordance with the generated transmission data,
wherein one bit of the transmission data includes a light-on period in which light is on for a predetermined time and a light-off period in which light is off for the predetermined time,
wherein the transmission data includes at least one of the light emission pattern of 0 and the light emission pattern of 1,
wherein the light emission pattern of 0 is in the light-on state continuously for two predetermined times and then in the light-off state continuously for four predetermined times, and
wherein the light emission pattern of 1 is in the light-on state continuously for four predetermined times and then in the light-off state continuously for two predetermined times.

2. The optical transmitter according to claim 1,
wherein a light emission pattern of 0 of the transmission data is a light emission pattern including a combination of a first predetermined light-on time with a first predetermined light-off time, and
wherein a light emission pattern of 1 of the transmission data is a light emission pattern including a combination of a second predetermined light-on time that is different from the first predetermined light-on time, and a second predetermined light-off time that is different from the first predetermined light-off time.

3. The optical transmitter according to claim 1,
wherein one bit of the transmission data comprises six predetermined times.

4. The optical transmitter according to claim 1,
wherein the transmission data comprises a start bit in the light-off state or the light-on state in an entire predetermined time before the transmission information and a parity bit after the transmission information.

5. An optical transmission method of an optical transmission device having a light emitting part, the optical transmission method comprising:
a generating step generating transmission information including identification information unique to a device and composed of a plurality of bits and generating transmission data with each bit of the generated transmission information in combination of a light-off state and a light-on state; and
a transmitting step transmitting a unique beacon signal by controlling the light-on state and the light-off state of the light emitting part in accordance with the generated transmission data,
wherein one bit of the transmission data includes a light-on period in which light is on for a predetermined time and a light-off period in which light is off for the predetermined time,
wherein the transmission data includes at least one of the light emission pattern of 0 and the light emission pattern of 1,
wherein the light emission pattern of 0 is in the light-on state continuously for two predetermined times and then in the light-off state continuously for four predetermined times, and
wherein the light emission pattern of 1 is in the light-on state continuously for four predetermined times and then in the light-off state continuously for two predetermined times.

\* \* \* \* \*